US008486526B2

(12) United States Patent
Spilman et al.

(10) Patent No.: US 8,486,526 B2
(45) Date of Patent: Jul. 16, 2013

(54) LOW VOLATILES COATINGS, SEALANTS AND BINDERS FROM RENEWABLE OILS

(75) Inventors: Gary E. Spilman, Midland, MI (US); John N. Argyropoulos, Midland, MI (US); Debkumar Bhattacharjee, Lake Jackson, TX (US); Paul J. Popa, Auburn, MI (US); William A. Koonce, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 409 days.

(21) Appl. No.: 12/597,061

(22) PCT Filed: Apr. 10, 2008

(86) PCT No.: PCT/US2008/059863
§ 371 (c)(1),
(2), (4) Date: Feb. 16, 2010

(87) PCT Pub. No.: WO2008/134217
PCT Pub. Date: Nov. 6, 2008

(65) Prior Publication Data
US 2010/0178502 A1    Jul. 15, 2010

Related U.S. Application Data

(60) Provisional application No. 60/926,632, filed on Apr. 27, 2007.

(51) Int. Cl.
*B32B 7/12* (2006.01)
*B32B 27/00* (2006.01)
*B32B 27/40* (2006.01)
*B05D 3/02* (2006.01)
*C08G 63/08* (2006.01)

(52) U.S. Cl.
USPC .................................................... 428/355 R

(58) Field of Classification Search
USPC ............. 428/411.1, 423.1, 355 R; 427/385.5; 528/354
See application file for complete search history.

(56) References Cited

U.S. PATENT DOCUMENTS

| | | | |
|---|---|---|---|
| 2,750,395 A | 6/1956 | Phillips et al. | |
| 2,890,194 A | 6/1959 | Phillips et al. | |
| 3,318,822 A | 5/1967 | Batzer et al. | |
| 4,508,853 A | 4/1985 | Kluth et al. | |
| 4,633,021 A | 12/1986 | Hanes | |
| 4,731,486 A | 3/1988 | Abatjoglou et al. | |
| 4,877,455 A * | 10/1989 | Brauer et al. | 106/244 |
| 6,107,403 A | 8/2000 | Shepler | |
| 6,221,494 B1 | 4/2001 | Barsotti et al. | |
| 6,255,504 B1 | 7/2001 | Roberts et al. | |
| 6,316,643 B1 | 11/2001 | Roberts et al. | |
| 6,433,121 B1 | 8/2002 | Petrovic et al. | |
| 6,686,435 B1 | 2/2004 | Petrovic et al. | |
| 8,080,317 B2 * | 12/2011 | Watanabe | 428/407 |
| 2004/0242910 A1 | 12/2004 | Dwan 'Isa et al. | |
| 2006/0041157 A1 | 2/2006 | Petrovic et al. | |
| 2006/0183848 A1 * | 8/2006 | Maier et al. | 524/589 |
| 2008/0044661 A1 | 2/2008 | Hazell | |

FOREIGN PATENT DOCUMENTS

| | | |
|---|---|---|
| EP | 0444454 A2 | 9/1991 |
| EP | 0984916 A1 | 3/2000 |
| WO | WO-01/04225 A1 | 1/2001 |
| WO | WO-2004/096744 A2 | 11/2004 |
| WO | WO-2004/096882 A1 | 11/2004 |
| WO | WO-2004/096883 A1 | 11/2004 |
| WO | WO-2005/010067 A1 | 2/2005 |
| WO | WO-2006/116456 A1 | 11/2006 |
| WO | WO-2007/020269 A1 | 2/2007 |

OTHER PUBLICATIONS

Low Cost Polyols from Natural Oils, Paper 36, 1995, Colvin et al., UTECH Asia.
Phenoplasts, pp. 9-29, T.S. Carswell, Interscience Publishers, Inc., New York (1947).

* cited by examiner

*Primary Examiner* — Thao T. Tran
(74) *Attorney, Agent, or Firm* — Whyte Hirschboeck Dudek S.C.

(57) ABSTRACT

A composition comprises (a) a binder component which comprises (1) 5 to 100 weight percent of at least one natural oil derived polyol having at least about 50 percent primary hydroxyl groups and (2) sufficient additional polyol different from a natural oil derived polyol to make 100 percent wherein the natural oil derived polyol has an average of from 1.5 to 3 hydroxyl groups per molecule and an equivalent weight of from 200 to 5000; and (b) a crosslinking component reactive with hydroxyl groups. Furthermore, a process for producing a coating, adhesive, binder or combination thereof on the surface of a substrate, comprises in any order: (a) admixing binder and crosslinking components of a composition to form an admixture, wherein a binder component comprises (1) 5 to 100 weight percent of at least one natural oil derived polyol having at least about 50 percent primary hydroxyl groups and (2) sufficient additional polyol different from a natural oil derived polyol to make 100 percent wherein the natural oil derived polyol has an average of from 1.5 to 3 hydroxyl groups per molecule and an equivalent weight of from 200 to 5000; and (b) applying a layer of said admixture on said surface. The invention includes coatings, adhesives, binders and combinations thereof prepared from any composition of the invention, substrates coated by the process of the invention or coated using a composition of the invention and articles, including laminates, comprising a coating, adhesive, binder or combination thereof of the invention.

18 Claims, No Drawings

LOW VOLATILES COATINGS, SEALANTS AND BINDERS FROM RENEWABLE OILS

This invention relates to thermosetting compositions, particularly to thermosetting coating, sealant and binding compositions that utilize renewable raw materials.

Of the commercially available polyols, polyether- and polyester-containing materials are dominant. Polyether polyols are usually based on propylene oxide, ethylene oxide or tetrahydrofuran. These typically exhibit very good resistance to hydrolysis, which is an important requirement of many adhesives, sealants and coatings. However, polyether polyols promote adhesion to a very limited variety of substrates and generally have poor resistance to oxidative degradation. In contrast, polyester polyols generally promote adhesion to more types of surfaces and have very good oxidative stability, but are more susceptible to hydrolysis. Hydrolysis is optionally acid or base catalyzed.

Aliphatic polyester polyols with ester linkages have found widespread use in coatings, adhesives sealants and elastomers. These materials are generally based on caprolactone or adipic acid backbones. One of the more widely used commercial polyester polyols is based on polycaprolactone and commercially available from The Dow Chemical Company under the trade name Tone™ polyol. This polyester polyol is the product of the homopolymerization of caprolactone with a hydroxyl containing compound as an initiator, such as a diol, to form polycaprolactone polyols. These polyester polyol materials are hydrolytically more stable than adipate based polyester polyols, resistant to yellowing, display excellent abrasion, chemical and impact resistance, provide excellent resistance to oxidative degradation, and are considered to be the leaders of the commercial products which are currently available. However, such materials are generally solids at 25° C. which require heating (to 60° C.) prior to use and they are, therefore, often more difficult to formulate as compared to lower melting, lower viscosity polyols. They also have poorer hydrolytic stability than acrylic polyols which limits their use in blends with acrylics.

Aliphatic polyester polyols based on adipic acid are prepared by the condensation of adipic acid and a diol, such as 1,4-butanediol, as shown below:

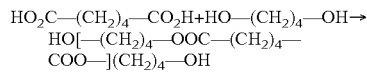

Polyesters such as poly(ethylene glycol/adipate), poly(diethylene glycol/adipate), poly(butylene/adipate), poly(hexanediol/adipate) and similar polyesters are often used as flexible components of coatings, binders and adhesives including such items as inks and sealants that are cured with various crosslinking agents. Typical crosslinking agents for polyester polyols are melamine/formaldehyde resins, polyisocyanates.

Coatings based on adipic acid polyols are well known to undergo hydrolytic degradation at the ester linkage sites of the molecule, especially in the presence of acid and base catalysts. However, the materials have the advantage of a low manufacturing cost, as compared to polycaprolactam polyester polyols.

It would be desirable to have a coating has a balance of desirable properties exhibited by either polycaprolactam polyesters or adipic acid polyesters. Independently, it would be desirable to have a polyol useful in making such coatings, sealants and binders that is a liquid at about 25° C. Additionally and independently, it would be desirable to have polyols with a viscosity of at most 10000 centipoise, preferably at most 5000, most preferably 1000 centipoise (cP) at a solids content of at least about 50 weight percent polyol in a solvent therefore, at a number average molecular weight of preferably at most about 2000 Daltons to overcome the difficulties presently encountered in high solids coatings and similar applications. Such high solids formulations are driven by both federal and state regulations to reduce the amount of solvent, especially volatile organic compounds (VOC) that may escape into the environment. Low molecular weight oligomers/polymers are used to achieve sufficiently low viscosity to be useful in high solids formulated systems. It would be desirable to have polyesters and coatings derived from them that have a balance of such properties as viscosity of at least about 50 cP, solids of at least about 50 percent, and VOC of at most about 4 lbs/gal (0.5 g/cm$^3$) so that energy can be conserved through use of less diluent solvent and so that federal and state regulations as well as community standards can be met.

Most commercially available polyols as previously described are produced from petroleum. However, the depletion of petroleum combined with its increasing price in our modern societies has encouraged researchers and governments to explore new ways to produce today's polymeric materials from renewable and cheap natural resources. Moreover, the production of petroleum based polyols poses an environmental problem.

Preparation of polyols useful from cheaper and renewable natural oils is highly desirable in order to alleviate the present environmental threat. Natural oils consist of triglycerides of saturated and unsaturated fatty acids. One natural oil, namely castor oil, is a triglyceride of ricinoleic acid (a fatty acid that contains secondary hydroxyl groups) and is used to produce polyols (Polycin™ GR polyols commercially available from Vertellus). Despite good thermal and hydrolytic stability when compared to their counterparts produced from petroleum-based polyols, castor oil-based polyurethanes have not found a wide application. The major drawback is that the slow reactivity of castor oil polyols, that is reactivity less than that of primary hydroxyl groups, limits their use to production of flexible and semi-rigid polyurethanes. Moreover, castor oil is produced in tropical regions, which increases its cost compared to oils such as soybean and corn, for example. Therefore, expensive polyols with higher reactivity than that of castor oil are needed.

Polyols have also been produced from natural oils by chemical reaction at the unsaturated sites. In the epoxidation/hydroxylation processes within the skill in the art such as are disclosed in such references as U.S. Pat. No. 4,508,853 and WO 2006/116456 A1, the double bond is converted into an epoxy group that is further opened in acidic solution. The resulting polyols also contain hydroxyl groups that are less reactive than primary hydroxyl groups, limiting their use in coating applications. Alternatively, oligomeric and branched fatty acids can be obtained by isomerization/oligomerization of the straight chain, unsaturated fatty acids. The reaction is conventionally carried out using a clay catalyst and is generally performed at very high temperatures or in high cost ionic liquids as disclosed in U.S. Pat. No. 6,316,643 and U.S. Pat. No. 6,255,504. These acids are known as C36 dimer acid, but often suffer with high amounts of trimer (C54) and higher fatty acids. Polyester polyols derived from C36 dimer acids such as the Priplast™ polyols commercially available from Uniquema are commercially available for making coatings. Because of their high carbon content, these polyols have lower than desired functionality for coating and related applications. Attempts to increase the functionality of these well known dimerized acids are described in such references as EP 0984916 B1, but the increased functionality is in the form of hydroxyl groups that are less reactive than primary hydroxyl groups. Thus, it would be desirable use polyols derived from renewable vegetable sources and having a reactivity greater than that of castor oil and polyols produced by epoxidation/hydroxylation, yet with lower carbon content than C36 dimer acids.

Polyester polyols derived from renewable raw materials, such as seed oils, would provide sustainable and green solutions to coatings and related applications, and reduce dependence on petrochemical based raw materials. Polyester polyols that would have improved water, acid, and other chemical resistance over those presently known would be highly desirable products for the preparation of hydrolytic resistant coatings, inks, adhesives, and sealants. Particularly desirable would be acid resistant coatings prepared from polyesters, since they would be important components in acid-rain resistant coatings.

To achieve acceptable solution viscosities (100 centipoise or less at application) for typical high solids coating systems, it is advantageous that the film-forming polymer have a number average molecular weight (Mn) lower than about 5000 Daltons. To achieve good film properties in such systems after crosslinking, it is also advantageous that the number average molecular weight (Mn) should exceed about 500 Daltons, and that each number average molecule should contain at least two reactive hydroxyl groups. These general principles apply to polyester polyols, acrylic polyols, and also to urethane polyols when crosslinked with melamine resins or with isocyanates. As is evident from the previous discussion, the requirements for acceptable solution viscosities and good film properties lead to contradictory molecular weight requirements, that is, for low solution viscosities the Mn should be low, but for good film properties the Mn should be high. Polyester polyols with inherently low viscosities, that is, viscosities below about 10000 centipoise, across a wide range of molecular weights would be very advantageous for coatings, inks, adhesives and sealants applications. Polyester polyols having higher reactivity than secondary hydroxyl groups with traditional crosslinkers, such as melamine/formaldehyde resins and polyisocyanates, would also be beneficial for use in lower temperature applications and lead to significant energy savings during application.

Surprisingly, using certain natural oil derived polyols in coatings results in coatings not only using renewable resources, but also with desirable flexibility or impact hardness as well as resistance to hydrolysis and solvents. The polyols are also useful in sealants and binders. Furthermore, these natural oil derived polyols are liquid at about 25° C., having a viscosity of at most about 10000 centipoise at a solids content of at least about 50 weight percent polyol in a solvent and are thus useful in high solids coatings, adhesives, and binders.

In one aspect the present invention includes a composition comprising (a) a binder component which comprises (1) 5 to 100 weight percent of at least one natural oil derived polyol having at least about 50 percent primary hydroxyl groups and (2) sufficient additional polyol different from a natural oil derived polyol to make 100 percent wherein the natural oil derived polyol has an average of from 1.5 to 3 hydroxyl groups per molecule and an equivalent weight of from 200 to 5000; and (b) a crosslinking component reactive with hydroxyl groups.

In another aspect the invention is, a process for producing a coating, adhesive, binder or combination thereof on the surface of a substrate, comprises in any order: (a) admixing binder and crosslinking components of a composition to form an admixture, wherein a binder component comprises (1) 5 to 100 weight percent of at least one natural oil derived polyol having at least about 50 percent primary hydroxyl groups and (2) sufficient additional polyol different from a natural oil derived polyol to make 100 percent wherein the natural oil derived polyol has an average of from 1.5 to 3 hydroxyl groups per molecule and an equivalent weight of from 200 to 5000; and (b) applying a layer of said admixture on said surface.

Further, the invention includes coatings, adhesives, binders and combinations thereof prepared from any composition of the invention, substrates coated by the process of the invention or coated using a composition of the invention, laminates thereof, and articles comprising a coating, adhesive, binder or combination thereof of the invention.

As used herein:

"Polymer solids," "composition solids," "solids level" or "solids content" means the percentage remaining of a polymer or composition of polymers after removal of any solvent, even when at least one component is possibly a liquid rather than a solid. Solids content is determined according to the procedures of U.S. Office of Federal Register, 40 CFR Part 60, Appendix A, Method 24.

"High solids composition" means a composition having a solids content of above 50 percent, preferably at least 60 percent, more preferably at least 70 percent, in weight percentages based on the total weight of the composition.

"Cure" or "curing" as used herein means reaction of a functional group on a polymer (such as a hydroxyl group in a polyol) with a crosslinking agent (such as a melamine/formaldehyde resin or a polyisocyanate.

The term "chemical resistance" is used to designate that resistance measured according to the procedures of ASTM D1308. Several drops of each chemical agent or stain designated in that procedure are placed on the coating and covered with a watch glass for 24 hours. After 24 hours, the chemical agent or stain is wiped off the coating with water. The coating is visually inspected for any signs of degradation, delamination, staining, etc. The coating is rated as a 1 (no effect) through 5 (severe staining, delamination, or degradation).

The term "solvent resistance" is used to designate that resistance measured according to the procedures of ASTM D5402. Methyl ethyl ketone is used to determine solvent resistance. The number of double rubs is recorded until degradation or delamination of the film is observed. The test is stopped at 200 double rubs if not effect on the coating is observed.

The term "hydrolytic resistance" or "hydrolytic stability" is used to designate that resistance measured according to the procedures of ASTM D4585-99 Standard Practice for Testing Water Resistance of Coatings Using Controlled Condensation.

The term "acid etch resistance" is used to designate that resistance measured according to the procedures described in detail hereinafter.

The term "flexibility" is used to designate impact properties measured according to the procedures of ASTM D2794.

The term "Tg" is used to mean the glass transition temperature and is measured according to the procedures of ASTM D3418.

The term "(meth) acrylic" means acrylic or methacrylic.

The term "NCO Index" means isocyanate index, as that term is commonly used in the polyurethane art. As used herein as the equivalents of isocyanate, divided by the total equivalents of isocyanate-reactive hydrogen containing materials, multiplied by 100. Considered in another way, it is the ratio of isocyanate-groups over isocyanate-reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

As used herein, "polyol" refers to an organic molecule having an average of greater than 1.0 hydroxyl groups per molecule.

The term "natural oil polyol" (hereinafter NOP) is used herein to refer to compounds having hydroxyl groups which compounds are isolated from, derived from or manufactured from natural oils, including animal and vegetable oils, preferably vegetable oils. Examples of vegetable and animal oils that are optionally used include, but are not limited to, soybean oil, safflower oil, linseed oil, corn oil, sunflower oil, olive oil, canola oil, sesame oil, cottonseed oil, palm oil, rapeseed oil, tung oil, fish oil, or a blend of any of these oils. Alternatively, any partially hydrogenated or epoxidized natural oil or genetically modified natural oil can be used to obtain the desired hydroxyl content. Examples of such oils include, but are not limited to, high oleic safflower oil, high oleic soybean oil, high oleic peanut oil, high oleic sunflower oil (such as NuSun™ sunflower oil), high oleic canola oil, and high erucic rapeseed oil (such as Crumbe oil). Natural oil polyols are well within the knowledge of those skilled in the art, for instance as disclosed in Colvin et al., UTECH Asia, Low Cost Polyols from Natural Oils, Paper 36, 1995 and "Renewable raw materials—an important basis for urethane chemistry:" Urethane Technology: vol. 14, No. 2, April/May 1997, Crain Communications 1997, WO 01/04225, WO 040/96882; WO 040/96883; U.S. Pat. No. 6,686,435, U.S. Pat. No. 6,433,121, U.S. Pat. No. 4,508,853, U.S. Pat. No. 6,107,403, US Pregrant publications 20060041157, and 20040242910.

The term "natural oil derived polyol" is used herein to refer to NOP compounds which are derived from natural oils. For instance, natural oils or isolates therefrom are reacted with compounds ranging from air or oxygen to organic compounds including amines and alcohols. Frequently, unsaturation in the natural oil is converted to hydroxyl groups or to a group which can subsequently be reacted with a compound that has hydroxyl groups such that a polyol is obtained. Such reactions are discussed in the references in the preceding paragraph. Natural oils which are polyols, such as castor oil, would be NOP compounds but distinguished from natural oil derived polyols.

The term "hydroxyl number" indicates the concentration of hydroxyl moieties in a composition of polymers, particularly polyols. A hydroxyl number represents mg KOH/g of polyol. A hydroxyl number is determined by acetylation with pyridine and acetic anhydride in which the result is obtained as the difference between two titrations with KOH solution. A hydroxyl number may thus be defined as the weight of KOH in milligrams that will neutralize the acetic anhydride capable of combining by acetylation with 1 gram of a polyol. A higher hydroxyl number indicates a higher concentration of hydroxyl moieties within a composition. A description of how to determine the hydroxyl number for a composition can be found in texts well-known in the art, for example in Woods, G., The ICI Polyurethanes Book—2nd ed. (ICI Polyurethanes, Netherlands, 1990).

The term "functionality" particularly "polyol functionality" is used herein to refer to the number of hydroxyl groups in a polyol.

All percentages, preferred amounts or measurements, ranges and endpoints thereof herein are inclusive, that is, "less than about 10" includes about 10. "At least" is, thus, equivalent to "greater than or equal to," and "at most" is, thus, equivalent to "to less than or equal to." Numbers herein have no more precision than stated. Thus, "105" includes at least from 104.5 to 105.49. Furthermore, all lists are inclusive of combinations of two or more members of the list. All ranges from a parameters described as "at least," "greater than," "greater than or equal to" or similarly, to a parameter described as "at most," "up to," "less than," "less than or equal to" or similarly are preferred ranges regardless of the relative degree of preference indicated for each parameter. Thus a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and are optionally set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter may be acceptable to achieve another desirable end.

The term "comprising", is synonymous with "including," "containing," or "characterized by," is inclusive or open-ended and does not exclude additional, unrecited elements, material, or steps. The term "consisting essentially of" indicates that in addition to specified elements, materials, or steps; elements, unrecited materials or steps are optionally present in amounts that do not unacceptably materially affect at least one basic and novel characteristic of the subject matter. The term "consisting of" indicates that only stated elements, materials or steps are present.

The invention includes a composition suited for various coating processes, such as spraying, electrostatic spraying, roller coating, dip-coating, or brushing. The composition comprises a natural oil derived polyol (binder component) and a crosslinking component reactive therewith.

Natural Oil Derived Polyol Binder Component

The natural oil derived polyol preferably has an average of at least about 1.5 hydroxyl groups per molecule, and preferably an average of at least about 1.75, more preferably at least about 2, and advantageously an average of at most about 3 hydroxyl groups per molecule, preferably at most about 2.75, more preferably at most about 2.6. Of the hydroxyl groups on the natural oil derived polyol or combination thereof, desirably at least about 50, advantageously at least about 75, more advantageously at least about 85, most advantageously at least about 90, preferably at least about 95, more preferably at least about 97, most preferably at least about 99 percent of the hydroxyl groups are primary hydroxyl groups. Since 100 percent primary hydroxyl groups are most preferred, there is no upper limit. The hydroxyl equivalent weight of the natural oil derived polyol should preferably be at least about 200, more preferably at least about 400, most preferably at least about 600, and preferably at most about 5000, more preferably at most about 1500, most preferably at most about 1000. The natural oil derived polyols having these preferred structures or a combination thereof are suitably used alone or blended with other polyols in the practice of the invention.

Polyols disclosed in WO 04/096882 and WO 04/096883 are most preferred. These are the reaction products of initiators having active hydrogen such as a polyol or polyamine, amino alcohol or mixture thereof with a vegetable oil based monomer prepared by such processes as hydroformylation of unsaturated fatty acids or esters, followed by hydrogenation of at least a portion of the resulting formyl groups. Such a polyol is referred to hereinafter as a "vegetable oil based polyol" ("VOB polyol") as they are in WO 04/096882 or as an "initiated fatty acid polyester alcohol." Optionally, the VOB polyol is used in mixture with other natural oil derived polyols, in which case the VOB polyol is desirably at least about 50, advantageously at least about 75, more advantageously at least about 85, most advantageously at least about 90, preferably at least about 95, more preferably at least about 97, most preferably at least about 99 weight percent of the natural oil polyols used.

In making a initiated fatty acid polyester alcohol preferred in the practice of the invention, a hydroxymethyl-containing polyester polyol is conveniently prepared by reacting a hydroxymethyl-group containing fatty acid having from 12-26 carbon atoms, or an ester of such a hydroxymethylated fatty acid, with a polyol, hydroxylamine or polyamine initiator compound having an average of at least 2 hydroxyl, primary amine and/or secondary amine groups/molecule. Proportions of starting materials and reaction conditions are selected such that the resulting hydroxymethyl-containing polyester polyol contains an average of at least 1.3 repeating units derived from the hydroxymethyl-group containing fatty acid or ester thereof for each hydroxyl, primary amine and secondary amine groups in the initiator compound, and the hydroxymethyl-containing polyester polyol has an equivalent weight of at least 400 up to 15,000. The hydroxymethyl-containing polyester polyol advantageously is a mixture of compounds having the following average structure (Structure 1):

1. $[H-X]_{(n-p)}-R-[X-Z]_p$ (I)

wherein R is the residue of an initiator compound having n hydroxyl and/or primary or secondary amine groups, where n is at least two; each X is independently —O—, —NH— or —NR'— in which R' is an inertly substituted alkyl, aryl, cycloalkyl, or aralkyl group, p is a number from 1 to n representing the average number of [X—Z] groups per hydroxymethyl-containing polyester polyol molecule, Z is a linear or branched chain comprising residues of fatty acids. "Inertly substituted" groups are groups that do not react with an isocyanate groups and which do not otherwise engage in side reactions during the preparation of the hydroxymethyl-group containing polyester polyol. Examples of such inert substituents include as aryl, cycloalkyl, silyl, halogen (especially fluorine, chlorine or bromine), nitro, ether, and ester.

In formula I, n is preferably from 2-8, more preferably from 2-6, even more preferably from 2-5 and especially from about 3-5. Each X is preferably —O—. The total average number of fatty acid residues per hydroxymethylated polyol molecule is preferably at least 1.5 times the value of n, such from 1.5 to 10 times the value of n, 2 to 10 times the value of n or from 2 to 5 times the value of n.

Hydroxymethyl-containing polyester polyols according to structure I can be prepared in a multi-step process from vegetable or animal fats that contain one or more carbon-carbon double bonds in at least one constituent fatty acid chain. Suitable fats include, for example, chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow.

The vegetable or animal fat is conveniently first subjected to a transesterification reaction with a lower alkanol, especially methanol or ethanol, to produce alkyl esters of the constituent fatty acids. The resulting alkyl esters are optionally hydrolyzed to the corresponding fatty acids if desired, but this step is usually not necessary or desirable. The alkyl esters (or fatty acids) are conveniently hydroformylated by reaction with carbon monoxide and hydrogen. This introduces —CHO groups onto the fatty acid chain at the site of carbon-carbon unsaturation. Suitable hydroformylation methods are described in U.S. Pat. Nos. 4,731,486 and 4,633,021, for example, and in U.S. Provisional Patent Application 60/465,663, filed Apr. 25, 2003, all incorporated herein by reference. Some fatty acid groups contain multiple carbon-carbon double bond sites. In such cases, the hydroformylation reaction may not introduce —CHO groups at all of the double bond sites. A subsequent hydrogenation step converts the —CHO groups to hydroxymethyl (—CH$_2$OH) groups while hydrogenating residual carbon-carbon bonds to remove essentially all carbon-carbon unsaturation. The resulting mixture of hydromethylated fatty acids is then reacted with an initiator compound, with removal of water or lower alkanol to form the polyester polyol.

The initiator contains two or more hydroxyl, primary amine or secondary amine groups, and can be a polyol, an alkanol amine or a polyamine. The initiator preferably has at least about 1 hydroxyl or amine groups, most preferably at least about 2, and preferably at most about 6, more preferably at most about 4, most preferably 3 hydroxyl or amine groups per molecule. Initiators of particular interest are low molecular weight polyols, preferably having a molecular weight of at least about 32, more preferably at least about 116, most preferably at least about 550, and preferably at most about 5000, more preferably at most about 10000, most preferably at least about 1000 Daltons. Such low molecular weight initiators include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, and dibutylene glycol. Polyether polyol initiators are useful but not preferred and include polymers of ethylene oxide and/or propylene oxide having from 2-8, especially 2-4 hydroxyl groups/molecule and a molecular weight of about 150-3000, especially from 200-1000. The resulting natural oil derived polyol having especially desired characteristics is prepared by reacting a hydroxymethyl group containing fatty acid alkyl ester composition having an average of at least about 0.5, more preferably at least about 0.75, most preferably at least about 1.0, and preferably at most about 2, more preferably at most about 1.75, most preferably at least about 1.5 hydroxymethyl groups per hydroxymethyl fatty acid ester.

Hydroxymethyl-containing fatty acids made in the foregoing process tend to be a mixture of materials having no hydroxymethyl groups, and materials having 1, 2 or 3 hydroxymethyl groups. The proportion of materials having 2 and 3 hydroxymethyl groups is typically somewhat lower than the proportion of starting fatty acids (or alkyl esters) containing 2 and 3 carbon-carbon double bonds, as the hydroformylation reaction often does not take place across all the carbon-carbon double bonds unless stringent reaction conditions are used. Carbon-carbon double bonds that are not hydroformylated generally become hydrogenated.

Detailed methods of making such hydroxymethyl-containing polyester polyols are described in WO2004/096882 which illustrates the skill in the art and is incorporated herein to the extent permitted by law.

The hydroxymethyl-containing polyester polyol so produced generally contains some unreacted initiator compound, and may contain unreacted hydromethylated fatty acids (or esters). Initiator compounds often react only monofunctionally or difunctionally with the fatty acids (or esters), and resulting polyester polyol often contains free hydroxyl or amino groups bonded directly to the residue of the initiator compound.

The natural oil derived polyol or combination thereof is optionally used with one or more polyols different from natural oil derived polyol. The polyol different from the natural oil derived polyol is suitably any polyol within the skill in the art and is referred to herein as additional or conventional polyol. Preferred additional polyols are acrylic polyols having at least two hydroxyl functional groups. The acrylic polyol is optionally a polymer of polymerizable unsaturated monomers containing a hydroxyl group or a polymer of one or more of these monomers and other α,β-unsaturated monomers, each obtained by radical polymerization under suitably selected conditions. Examples of the other α,β-unsaturated monomers include methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, cyclohexyl acrylate, cyclohexyl methacrylate, 2-ethylhexyl acrylate, 2-ethylhexyl methacrylate, stearyl acrylate, stearyl methacrylate, lauryl acrylate, lauryl methacrylate, styrene, α-methylstyrene, p-vinyltoluene, acrylonitrile, or combinations thereof.

Particularly useful hydroxyl containing (meth)acrylic polymers have a number average molecular weight of at least about 500, preferably at least about 1000, more preferably at least about 1500, most preferably at least about 2000 and at most about 5000, preferably at most about 10000, more preferably at most about 20000, most preferably at most about 100000 and a Tg from at least about −50, preferably at least about −25, more preferably at least about −10, most preferably at least about 0 and at most about 30, preferably at most about 50, more preferably at most about 75, most preferably at most about 100° C. Preferably they are the polymerization product of typical acrylic monomers, such as, alkyl (meth) acrylate monomers having 1 to 18 carbon atoms in the alkyl group and hydroxy functional monomer, such as, hydroxy alkyl (meth)acrylates having 1 to 4 carbon atoms in the alkyl group. The hydroxyl containing (meth)acrylic polymers are optionally polymerized from a monomer mixture that includes an ethylenically polymerized silane, such as, trimethoxy propyl silyl methacrylate; or tertiarybutylaminoethyl methacrylate. Some of the other suitable acrylic polymers are also listed in U.S. Pat. No. 6,221,494 on column 5, which illustrate the skill in the art and are incorporated herein by reference to the extent permitted by law.

Other polyols that can be used in combination with natural oil derived polyols include polyester polyols. These polyester polyols include reaction products of polyols, preferably diols, with polycarboxylic acids or their anhydrides, preferably dicarboxylic acids or dicarboxylic acid anhydrides. The polycarboxylic acids or anhydrides are optionally aliphatic, cycloaliphatic, aromatic and/or heterocyclic and are optionally substituted, such as with halogen atoms. The polycarboxylic acids are optionally saturated or unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1, 3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, and dibutylene glycol. Polycaprolactone polyols such as those sold by The Dow Chemical Company under the trade name "Tone" are also useful. Advantageously, polyester polyols used in combination with natural oil derived polyols as binders of the invention have a number average, molecular weight (Mn) ranging from about 400 to 20,000 and a Tg in the range of −50° C. to +100° C. The polyester polyols used in the practice of the invention have an average number of hydroxyl groups of preferably at least about 2, and preferably at most about 10, more preferably at most about 6 and most preferably at most about 4. Of these hydroxyl groups, an average at least one, preferably at least about 2, and preferably at most about 4 are primary hydroxyl groups. Some of the other suitable polyesters are also listed in U.S. Pat. No. 6,221,494 on column 5 and 6, which illustrates the skill in the art and is incorporated herein by reference to the extent permitted by law.

Additional polyols that can be used in combination with natural oil derived polyols also include all conventional polyols including polycarbonate polyols, polyurethane polyols, polyether polyols and other polyols within the skill in the art. The polyether polyols are advantageously a polymer of one or more alkylene oxides such as ethylene oxide, propylene oxide and 1,2-butylene oxide, or mixtures of such alkylene oxides. Preferred polyethers are polypropylene oxides or polymers of a mixture of propylene oxide and ethylene oxide. While any conventional polyol is suitably used, preferred polyols are those which are aliphatic polyols, more preferably polyester polyols, most preferably acrylic polyols. Those skilled in the art understand that the natural oil derived polyol is optionally a mixture of natural oil derived polyols and, independently, the additional polyol is a mixture of one or more polyols or types of polyols or a combination thereof.

For the purposes of this invention the polyol or polyol combination used to make a coating for use in the practice of the invention is referred to as natural oil derived polyol composition.

The natural oil derived polyol compositions include at least one natural oil derived polyol with at least one other polyol as the binding components of a coating. When using such blends, it is highly preferable that the natural oil derived polyol is miscible with the other polyol or polyols in the composition. the solubility parameter is a thermodynamic property useful in determining the miscibility of two pure substances. The enthalpy of mixing ($\Delta H_m$) of two substances can be approximated by the Hildebrand equation (equation 1). The Hildebrand equation uses the solubility parameters ($\delta$) of the two substances and the volume fractions ($\phi$) of the two substances to approximate $\Delta H_m$.

$$\Delta H_m = \phi_1 \phi_2 V (\delta_1 - \delta_2)^2 \quad \text{(eq. 1)}$$

Based on equation 1, the ideal situation for miscibility between the two substances occurs when the two substances have the same solubility parameter, so that $\Delta H_m = 0$. The solubility parameter may easily be determined for a volatile substance (such as a solvent) from its heat of vaporization, however for a higher molecular weight polymer (such as a natural oil derived polyol) this process is inapplicable due to its low volatility. The solubility parameter of a polymer can been determined by a number of techniques described in the literature, such as finding the solvents causing maximum swelling of a slightly crosslinked network of the polymer, measuring the intrinsic viscosity of a polymer dissolved in a solvent as a function of the solubility parameter of the solvent, or using reverse phase high pressure liquid chromatography (HPLC) methods. The alternative method is the calculation of solubility parameter from the group molar attraction constants. The solubility parameter for the natural oil derived polyol is calculated by a method developed by Hoy using equation 2.

$$\delta_T = (\Sigma F_T + 135.1)/V_M \quad \text{(eq. 2)}$$

where $\Sigma F_T$ is the sum of all the group molar cohesion constants ($F_T$) and $V_M$ is the molar volume (molecular weight divided by density). Hoy has also developed methods to calculate the solubility parameters of meth(acrylic) polymers. These methods are described in the literature (see Hoy, J. Paint Technology, 1970, p. 76 and Hoy, Tables of Solubility Parameters, Union Carbide Corporation, 1969 and 1975, and Guner, European Polymer Journal, 2004, p. 1587) along with the methods to calculate the three dimensional solubility parameters (eq. 3).

$$\delta_T = (\delta^2_{H\text{-}Bonding} + \delta^2_{Polar} + \delta^2_{Non\text{-}Polar})^{1/2} \quad \text{(eq. 3)}$$

where $\delta_{H\text{-}Bonding}$ is the hydrogen bonding solubility parameter, $\delta_{Polar}$ is the polar solubility parameter, and $\delta_{Non\text{-}Polar}$ is the non-polar solubility parameter.

The calculated solubility parameters of various (meth) acrylic polyols and natural oil derived polyols are summarized in tables 1 and 2 of the examples herein, respectively. it has been found in the practice of this invention that certain (meth)acrylic polymers are particularly useful in combination with the natural oil derived polyols used in the practice of the invention. These (meth)acrylic polymers are miscible with the natural oil derived polyols, when the difference in their calculated total Hoy solubility parameter (as previously described) is at most about 1.5, advantageously at most about 1.0, preferably at most about 0.75, more preferably at most about 0.5, most preferably at most about 0. The difference in the three dimensional components of the solubility parameter (as described previously) is at most about 1.0, preferably at most about 0.75, more preferably at most about 0.5, most preferably at most about 0. Where more than two polyols are used, advantageously at least about 50, more advantageously at least about 60, most advantageously at least about 70, preferably at least about 80, more preferably at least about 90, most preferably at least about 95, and ideally 100 weight percent of each of the combination of natural oil derived polyols, the additional polyols or a combination thereof are independently within one or more of these preferred ranges of solubility parameters. Furthermore where the binder component comprises at least one natural oil derived polyol and other polyols, which may be natural oil derived polyols, additional polyols or a combination of both, more preferably each of the other polyols that are present in an amount greater than about 5 weight percent of the binder component has a calculated Hoy solubility parameter differing from that of the natural oil derived polyol by advantageously by at most about 1.5 units, more advantageously by at most about 1.0, preferably by at most about 0.75, more preferably at most about 0.5 and most preferably about 0 units, More preferably, the natural oil derived polyol from which the difference in Hoy solubility parameter is measured is that natural oil polyol present in an amount greater than or equal to the amount of any other natural oil derived polyol present, most preferably it is greater than 50 weight percent of the total natural oil derived polyol present.

The novel composition of the present invention includes binder and crosslinking components. The binder component includes at least about 5 weight percent natural oil derived polyol, preferably at least about 20, more preferably at least about 40, most preferably at least about 60 percent and at most 100 percent, preferably at most about 90, more preferably at most about 80, most preferably at most about 70 percent; the percentages being in weight percentages based on the total weight of the binder component the composition. Solvent or other liquid medium or carrier is optionally also present, but not included in the term "binder component" which only includes compounds which react to become part of the coating.

Crosslinking Component

The composition of the present invention includes a crosslinking component, which is suitably any compound or combination of compounds which are reactive with hydroxyl groups on the polyol or polyols in the binder component to form a polymer, such as aminoplast resins, polyisocyanates, phenolics, cycloaliphatic epoxides or combinations thereof, most preferably selected from the group consisting of at least one polyisocyanate having at least two reactive isocyanate groups, at least one melamine formaldehyde resin and combinations thereof.

A polyisocyanate has at least 2 and on an average preferably at least about 2.5, more preferably at least about 2.7, most preferably at least about 3 and at most about 4, preferably at most about 3.75, more preferably at most about 3.50, most preferably at most about 3.25 isocyanate functionalities on average per molecule. Typically the composition has a mole ratio of isocyanate groups on the polyisocyanate in the crosslinking component to hydroxyl groups of the total polyol of at least about 0.90, preferably at least about 0.95, more preferably at least about 1.0, most preferably at least about 1.05 to at most about 1.10.

Examples of suitable polyisocyanates include aromatic, aliphatic or cycloaliphatic di-, tri- or tetra-isocyanates, including polyisocyanates having isocyanurate structural units, such as, the isocyanurate of hexamethylene diisocyanate, the isocyanurate of isophorone diisocyanate, the isocyanurate of 1,3-cyclohexanebis(isocyanatomethyl), the isocyanurate of 1,4-cyclohexanebis(isocyanatomethyl) and the isocyanurate of a mixture of 1,3- and 1,4-cyclohexanebis (isocyanatomethyl); the adduct of 2 molecules of a diisocyanate, such as, hexamethylene diisocyanate; uretidiones of hexamethylene diisocyanate; uretidiones of isophorone diisocyanate or isophorone diisocyanate; isocyanurate of meta-tetramethylxylylene diisocyanate; and a diol such as, ethylene glycol.

Additional examples of suitable polyisocyanates include 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, 1,3-cyclopentane diisocyanate, 1,2-cyclohexane diisocyanate, 1,4-cyclohexane diisocyanate, isophorone diisocyanate, 1,3-cyclohexanebis(isocyanatomethyl), 1,4-cyclohexanebis(isocyanatomethyl), mixture of 1,3- and 1,4-cyclohexanebis(isocyanatomethyl), 4-methyl-1,3-diisocyanatocyclohexane, trans-vinylidene diisocyanate, dicyclohexyl methane-4,4[prime]-diisocyanate, 3,3[prime]-dimethyldicyclohexylmethane4,4[prime]-diisocyanate, a toluene diisocyanate, 1,3-bis(1-isocyanato 1-methylethyl)benzene, 1,4-bis(1-isocyanato-1-methylethyl)benzene, 1,3-bis(isocyanatomethyl)benzene, xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4[prime]-diisocyanatodiphenyl, 3,3[prime]-dichloro-4,4[prime]-diisocyanatodiphenyl, 3,3[prime]-diphenyl-4,4[prime]-diisocyanatodiphenyl, 3,3[prime]-dimethoxy-4,4[prime]-diisocyanatodiphenyl, 4,4[prime]-diisocyanatodiphenylmethane, 3,3[prime]-dimethyl-4,4[prime]-diisocyanatodiphenyl methane, a diisocyanatonaphthalene, polyisocyanates having isocyanaurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water (available under the trademark Desmodur™ N from Bayer Corporation of Pittsburgh, Pa.), the adduct of 1 molecule of trimethylol propane and 3 molecules of toluene diisocyanate (available under the trademark Desmodur™ L from Bayer Corporation), the adduct of 1 molecule of trimethylol propane and 3 molecules of isophorone diisocyanate, compounds such as 1,3,5-triisocyanato benzene and 2,4,6-triisocyanatotoluene, and the adduct of 1 molecule of pentaerythritol and 4 molecules of toluene diisocyanate.

The isocyanate functionalities of the polyisocyanate are optionally capped with a monomeric alcohol to prevent premature crosslinking in a one-pack composition. Some suitable monomeric alcohols include methanol, ethanol, propanol, butanol, isopropanol, isobutanol, hexanol, 2-ethylhexanol and cyclohexanol.

When used as the sole crosslinking component, an isocyanate or combination thereof is present in an amount corresponding to preferably at least about 0.95, more preferably at least about 0.99, most preferably at least about 1.0 and at most about 1.10, preferably at most about 1.05, more preferably at most about 1.03, most preferably at most about 1.01 of a stoichiometric amount of hydroxyl groups on the polyol or polyols in the binding component as determined by hydroxyl number.

Clear coat compositions or pigmented mono-coat or basecoat compositions are optionally formulated using at least one natural oil derived polyol as binding component and at least one polyisocyanate as a crosslinking component.

Alternatively, the crosslinking component includes at least one aminoplast. Aminoplasts, include for instance, alkoxymelamines, melamine-formaldehydes, urea-formaldehydes, alkylated benzoquaniamines, guanyl ureas, guanidienes, biguanidines, such as hexamethoxymethylmelamine, methylated melamine, butylated melamine, and butylated urea. In this application melamine formaldehyde resins are used as illustrative of aminoplasts. Thus, other aminoplasts would be used similarly. Melamine formaldehyde resins, commonly referred to as melamines, include monomeric or polymeric melamines or a combination thereof. Alkoxy monomeric melamines are preferred.

In the context of the present invention, the term "alkoxy monomeric melamine" means a low molecular weight melamine which contains, on an average three or more methylol groups etherized with a C1 to C5 monohydric alcohol, such as, methanol, n-butanol, or isobutanol per triazine nucleus, and has an average degree of condensation up to 2 and preferably in the range of about 1.1 to 1.8, and has a proportion of mononuclear species not less than about 50 percent by weight. The polymeric melamines have an average degree of condensation of more than 1.9

Some of such suitable monomeric melamines include highly alkylated melamines, such as, methylated, butylated, isobutylated melamines and mixtures thereof. More particularly hexamethylol melamine, trimethylol melamine, partially methylated hexamethylol melamine, and pentamethoxymethyl melamine are preferred. Hexamethylol melamine and partially methylated hexamethylol melamine are more preferred and hexamethylol melamine is most preferred.

Many of these suitable monomeric melamines are supplied commercially. For example, Cytec Industries Inc., West Patterson, N.J. supplies Cymel™ 301 (degree of polymerization of 1.5, 95 percent methyl and 5 percent methylol), Cymel™ 350 (degree of polymerization of 1.6, 84 percent methyl and 16 percent methylol), 303, 325, 327 and 370, which are all monomeric melamines. Suitable polymeric melamines include high amino (partially alkylated, —N, —H) melamine known as Resimene™ BMP5503 (molecular weight 690, polydispersity of 1.98, 56 percent butyl, 44 percent amino), which is supplied by Solutia Inc., St. Louis, Mo., or Cymel™ 1158 provided by Cytec Industries Inc., West Patterson, N.J.

Cytec Industries Inc. also supplies Cymel™ 1130 at 80 percent solids (degree of polymerization of 2.5), Cymel™ 1133 (48 percent methyl, 4 percent methylol and 48 percent butyl), both of which are polymeric melamines.

The composition wherein when at least one melamine formaldehyde resin or other aminoplast is the crosslinking component, the composition contains at least about 10, preferably at least about 15, more preferably at least about 20, most preferably at least about 30 and at most about 50, preferably at most about 45, more preferably at most about 40, most preferably at most about 35 percent melamine formaldehyde or aminoplast resin, all percentage being weight percentages based on the total weight of the binder and crosslinking components solids.

Alternatively, other crosslinking components within the skill in the art are used. Among these are phenolics and cycloaliphatic epoxides.

Phenolic crosslinking agents are the soluble, heat-reactive phenols or resoles such as those described in T. S. Carswell, Phenoplasts, pages 9-29, Interscience Publishers Inc., New York (1947) and in J. A. Brydson, Plastics Materials, pages 385-386, D. Van Nostrand Co. Inc., New Jersey (1966). Such heat reactive phenolics are generally made by reacting various phenols with an excess of formaldehyde under basic conditions. Illustrative of the heat-reactive phenolics are monomers and polymers of alkylated phenol-formaldehyde, alkylated cresol-formaldehyde, including methylated phenol-formaldehyde, butylated phenol-formaldehyde, and cresol-formaldehyde, as well as the variety of heat reactive phenolics made by reacting phenol, propyl phenols, butyl phenols, amyl phenols and higher hydrocarbon phenols, o-, m-, and p-cresol, and xylenols, with formaldehyde in the presence of a suitable catalyst such as ammonia, ethylamine, triethylamine, as well as other phenolics which are known in the art of making heat reactive phenolics.

Illustrative of the cycloaliphatic epoxides that are useful as crosslinking agents are those having an average of two or more epoxide groups per molecule such as 3,4-epoxycyclohexylmethyl 3,4-epoxycyclohexanecarboxylate, 3,4-epoxy-1-methyl-cyclohexylmethyl 3,4-epoxy-1-methylcyclohexanecarboxylate, 6-methyl-3,4-epoxycyclohexylmethyl 6-methyl-3,4-cyclohexanecarboxylate, the compounds described in U.S. Pat. No. 2,890,194; bis(3,4-epoxycyclohexylmethyl)oxylate, bis(3,4-epoxycyclohexylmethyl)-adipate, bis(3,4-epoxycyclohexylmethyl)pimelate, bis(3,4-epoxy-6-methylcyclohexylmethyl), the compounds described in U.S. Pat. No. 2,750,395; 3,4-epoxycyclohexyl-5,5-spiro-3,4-epoxy)cyclohexane-m-dioxane, and like compounds as described in U.S. Pat. No. 3,318,822; cyclopentadiene diepoxide, cyclohexane diepoxide, and limonene diepoxide. If desired, the formulations may contain minor amounts of cycloaliphatic monoepoxides such as limonene monoepoxide, vinyl cyclohexene monoepoxide, alpha-pinene monoepoxide, norbornene monoepoxide, cyclohexene monoepoxide, as well as 3,4-epoxy derivatives of alkoxylated and/or lactone derivatives of tetrahydrobenzyl alcohol. Aromatic epoxides, such as Bisphenol A and Bisphenol F epoxy resins can also be used as crosslinkers.

The composition preferably includes one or more catalysts to enhance crosslinking of the components on curing. Amounts of catalyst vary with many factors including identity and amounts of the binder and crosslinking components, identity of catalyst, desired shelf life before use, temperatures intended for application, and surfaces to be coated. Formulations including natural oil derived polyols advantageously use those amounts within the skill in the art for similar compositions with polyester polyols not derived from natural oils.

Some of the suitable catalysts for melamine include at least one conventional acid catalyst, such as, an aromatic sulfonic acid, for example, dodecylbenzene sulfonic acid, para-toluenesulfonic acid and dinonylnaphthalene sulfonic acid, all of which are either unblocked or blocked, for instance, with an amine, such as, 2-amino-2-methyl-1-propanol, N,N-dimethylethanolamine or a combination of such amines. Other suitable acid catalysts include strong acids, such as phosphoric acids, more particularly phenyl acid phosphate, which is optionally unblocked or blocked, for instance, with at least one amine.

Some of the suitable catalysts for polyisocyanate include one or more tin compounds, tertiary amines or a combination thereof; and one or more acid catalyst as previously described. Suitable tin compounds include dibutyl tin dilaurate, dibutyl tin diacetate, stannous octoate, and dibutyl tin oxide. Dibutyl tin dilaurate is preferred. Suitable tertiary amines include triethylene diamine. One commercially available catalyst that is optionally used is Fastcat™ 4202 dibutyl tin dilaurate sold by Elf-Autochem North America, Inc. Philadelphia, Pa.

The composition of the present invention optionally further contains at least one organic solvent advantageously selected from the group consisting of aromatic hydrocarbons, such as, petroleum naphtha or xylenes; ketones, such as, methyl amyl ketone, methyl isobutyl ketone, methyl ethyl ketone or acetone; esters, such as butyl acetate or hexyl acetate; and glycol ether esters, such as, propylene glycol monomethyl ether acetate. The amount of organic solvent added depends upon the desired solids level as well as the desired amount of VOC of the composition. If desired, the organic solvent is optionally added to both components of the binder.

The solids level of the coating of the present invention advantageously varies from advantageously at least about 50, preferably at least about 60, more preferably at least about 70, most preferably at least about 80 to advantageously at most about 85, preferably at most about 90, more preferably at most about 95, most preferably at most about 100, all percentages being based on the total weight of the composition.

To improve weatherability of a clear coating, 0.1 to 5 weight percent, preferably 1 to 2.5 weight percent and more preferably 1.5 to 2 weight percent, based on the weight of the total weight of the binder and the crosslinking components solids of an ultraviolet light stabilizer or a combination of ultraviolet light stabilizers and absorbers are optionally added. These stabilizers include ultraviolet light absorbers, screeners, quenchers and specific hindered amine light stabilizers. Also, about 0.1 to 5 percent by weight, based on the total weight of the binder and the crosslinking components solids, of an antioxidant is optionally added. Such stabilizers are well known in the art and commercially available.

The novel composition is particularly well suited for use in architectural, automotive OEM and refinish, and general industrial coatings. For coating applications where the applied coating can be baked, the composition of the invention is optionally a one-package composition wherein the natural oil derived polyol containing binder component and crosslinking component are blended together and applied. When the crosslinking component includes a melamine, it is optionally blended with the binder component. Advantageously, little or no crosslinking occurs until an applied layer of the composition is baked at an elevated temperature above room temperature. When the crosslinking component includes a polyisocyanate, it is advantageously mixed with the binder component just before application or if the reactive isocyanate groups on the polyisocyanate are inactivated with a blocking agent that unblocks upon baking or otherwise inhibited from reacting until heated, the crosslinking component containing the blocked polyisocyanate is optionally blended with the binder component and the composition remains stable.

For some applications, such as when the novel composition is used for ambient cure applications, such as automotive refinish and bridge coatings, where the applied coating can not be baked, a two-pack composition is provided in which the binder component containing the natural oil derived polyol is included in one pack and the crosslinking component containing the polyisocyanate is included in the second pack and the two packs are mixed together just before application.

The composition of the present invention is optionally supplied in the form of a two-pack composition in which the first-pack includes the binder component and the second pack includes the crosslinking component containing polyisocyanate. Generally the first and the second pack are stored in separate containers and mixed before use. The containers are preferably sealed air tight to prevent degradation during storage. The mixing is optionally accomplished, for example, in a mixing nozzle or in a container. When the crosslinking component contains the polyisocyanate, the curing step optionally takes place under ambient conditions, or if desired, at elevated baking temperatures.

Alternatively, when the isocyanates functionalities of the polyisocyanate are blocked, both the components of the composition are optionally stored in the same container in the form of a one-pack composition. When the crosslinking component contains the blocked polyisocyanate, the curing step takes place at elevated baking temperatures.

If the crosslinking component contains melamine, the composition is optionally formulated as a one pack composition since the melamine does not react with the natural oil derived polyol under normal storage conditions and elevated baking temperature is required to cure or crosslink a layer of the composition into a coating.

When the crosslinking component contains the polyisocyanate and melamine, the curing step occurs in two stages, first stage taking place under ambient conditions and the second stage taking place at elevated baking temperatures.

The first-pack of the two-pack composition contains the binder component and the second-pack contains the crosslinking component, which includes the polyisocyanate. If desired, the melamine is optionally in the first-pack. The two packs are mixed just prior to use or, for instance, about 5 to 30 minutes before use to form a potmix. A layer of the potmix is typically applied to a substrate by conventional techniques, such as, spraying, electrostatic spraying, roller coating, dipping or brushing. If used as a clear coating, a layer having a thickness advantageously in the range of from 25 micrometers to 75 micrometers is applied over a metal substrate, such as, automotive body, which is often pre-coated with other coating layers, such as an electrocoat, primer and a basecoat. The two pack composition is advantageously dried and cured at ambient temperatures or alternatively baked upon application for about 10 to 60 minutes at baking temperatures ranging from 80° C. to 160° C. The mixture optionally also contains pigments and is optionally applied as a mono coat or a basecoat layer over a primed substrate.

When a one-pack composition containing a blocked polyisocyanate or a melamine is used, a layer thereof applied over a substrate using afore-described application techniques, is cured at a baking temperature in the range of from 80° C. to 200° C., preferably in the range of 80° C. to 160° C., for instance for about 60 to 10 minutes. It is understood that actual baking temperature would vary depending upon the catalyst and blocking agent used and the amount thereof, thickness of the layer being cured and the blocked isocyanate functionalities and the optional melamine utilized in the composition. The use of the foregoing baking step is particularly useful under OEM conditions.

If desired, the composition is optionally pigmented to form a colored mono coat, basecoat, or primer, especially for use as a coating. About 0.1 percent to 200 percent by weight, based on the total weight of the binder and crosslinking component solids, of conventional pigments are optionally added using conventional techniques in which a mill base containing pigment, dispersant and solvent is first formed. The mill base is then mixed with the composition to form a colored composition. This composition is optionally applied and cured as previously described.

The composition of the present invention is suitable for providing clear or pigmented coatings on variety of substrates, such as metal, plastic, composite, wood, concrete substrates. The present composition is especially suitable for providing low VOC coatings, sealants or binders from renewable raw materials with improved properties, such as better hydrolytic and acid etch resistances than adipate polyols and better flexibility and lower viscosity than acrylic polyols. A low VOC coating is one from which less than about 150-250 g/L based on EPA definition of low VOC content for coatings materials listed in their RTP (Research Triangle Park) facility construction contract (Appendix A, www.epa.gov/opptintr/epp/pubs/grnbldg.pdf) volatile organic compounds are evaporated or otherwise removed in the course of forming the coating. For purposes of the present invention, a solids content of at least 50 weight percent is considered low VOC.

Compositions of the invention are useful as coatings, inks, adhesives, sealants, binders and combinations thereof. The coatings are advantageously architectural, automotive OEM and refinish, and general industrial coatings. Compositions of the invention are particularly useful to prepare acid resistant coatings preferably when prepared from polyesters. Such coatings are useful as automotive clear coatings, especially those used to cover color coats in what is known as clear coat/color coat systems as well as in other end uses including outdoor signs, functional and decorative coatings for metal and plastics, as for example in outdoor signs, coatings for electronic parts, and similar end uses. As sealants, the compositions are useful for sealing open spaces such as cracks, for sealing out water or other materials, and for sealing like or different items such as layers of various substrates together. As binders, the compositions are useful in forming composites.

The composition of the present invention optionally also contains conventional additives, such as, stabilizers, rheology control agents, flow agents, toughening agents and fillers. The presence and amount of such additional additives depends on the intended use of the composition. For instance, fillers, pigments, and other additives that would adversely effect the clarity of the cured coating will not be included if the composition is intended to be used as a clear coating. The foregoing additives are optionally added to either the binder or crosslinking component, or both, depending upon the intended use of the composition.

Objects and advantages of this invention are further illustrated by the following examples. The particular materials and amounts thereof, as well as other conditions and details, recited in these examples should not be used to limit this invention. Unless stated otherwise all percentages, parts and ratios are by weight. Examples of the invention are numbered while comparative samples, which are not examples of the invention, are designated alphabetically.

EXAMPLES

The following procedures were used for generating data reported in the examples hereinafter:

The acrylic polyol, natural oil derived polyol, other polyols or combinations thereof were blended in a glass vial at the levels cited in the tables below. The materials were mixed by hand using a spatula. The compatibility of each formulation was observed using two different tests.

Test 1—A drop of each of the blends of polyols was placed on a microscope slide. The slide was placed in an oven at 140° C. for 10 minutes. The slide was removed from the oven and allowed to cool to room temperature. The clarity of the drop was then recorded.

Test 2—The remaining blend was allowed to sit in the vial overnight at ambient lab conditions. The next day visual observations were recorded noting any haziness and phase separation. Blends that are 2 phases were not formulated or tested further.

The blends that do not phase separate were then fully formulated by adding monomeric melamine commercially available from Cytec Industries, New Jersey, under the trade designation Cymel™ 303, and mixing by hand using a spatula. The solvent blend was added which was 1:1:1 by weight blend of n-butyl propionate from The Dow Chemical, Michigan; n-propyl propionate from The Dow Chemical Company, Michigan; and methyl isobutyl ketone from Aldrich Chemical, Wisconsin. The solvent blend was mixed by hand using a spatula. Then an acid catalyst commercially available from Cytec Industries, New Jersey under the trade designation Cycat™ 4040 was added and mixed by hand using a spatula.

Solubility parameters were obtained as previously described.

Coating Application & Cure

The coatings were applied to 0.025"×4"×12" (0.06×10.16×30.48 cm) aluminum chromate pretreated and steel phosphate pre-treated panels using a #46 wire wound rod. The panels were pre-cleaned by wiping with a lint free cloth and isopropanol to remove oils and dried with compressed air. The coatings were cured at 140° C. for 30 minutes.

Coating Formulation Viscosity Measurements

The viscosity of each formulation was tested using a programmable rheometer commercially available from Brookfield, Mass. under the trade designation DV-III using either spindles 15, 31, or 34 as specified in the tables below. The speed was selected to maintain a torque reading between 20-80 percent. The temperature was recorded for each formulation.

Cured Coating Tests

Film Thickness

A minimum of 5 readings were taken using a dry coating thickness gauge commercially available from DeFelsko Corporation, New York under the trade designation Positector 6000. These readings were averaged.

Specular Gloss (ASTM D523) the ASTM Procedure D523 was Used to Measure Specular Gloss of the Cured Panels at 20 and 60 Degree Angles.

Cross-Hatch Adhesion

The procedure of ASTM D3359 (cross-hatch adhesion) was used to measure the adhesion of the coatings and rated according to the ASTM guidelines. Coatings of the invention preferably have a cross hatch adhesion of at least about 4B and most preferably 5B which is the highest rating.

Solvent Resistance—Double Rubs

The procedure of ASTM D5402 using methyl ethyl ketone was used to determine solvent resistance. The number of double rubs was recorded when degradation or delamination of the film was observed. The test was stopped at 200 double rubs if not effect on the coating was observed. Coatings of the invention preferably have a solvent resistance of at least about 150, more preferably at least about 175, most preferably at least about 200 double rubs. Since infinite solvent resistance would be desirable, there was no upper limit other than the limit of measurement, namely 200 double rubs.

Pendulum Hardness

Pendulum Hardness was measured according to ASTM D4366 using a König Pendulum tester from Byk-Gardner, Maryland. Coatings of the invention preferably have a pendulum hardness of at least about 40, more preferably at least about 50, most preferably at least about 60 seconds. Since infinite hardness would be desirable, there was no upper limit.

Pencil Hardness

Pencil hardness was run according to ASTM D3363. Coatings of the invention preferably have a pencil hardness of at least about 2 B, more preferably at least about HB, most preferably at least about F. Since infinite hardness would be desirable, there was no upper limit.

Microhardness (Viker's and Universal Hardness)

The microhardness was measured on the cured coatings using a microindentor with a Vickers indentor commercially available from Fisher Technology, Connecticut under the trade designation FISCHERSCOPE H100C used in conjunction with control software commercially available from Fischer Technology, Connecticut under the trade designation WIN-HCU. The microindentor was programmed to an applied force of 5 mN (rate=5 mN/20 seconds). By taking into account the geometry of the indenter and the penetration depth for the applied force the Universal Hardness, HU, and Vicker's Hardness were obtained. Coatings of the invention preferably have a Universal Hardness of at least about 10, more preferably at least about 20, most preferably at least about 30. Since infinite hardness would be desirable, there was no upper limit.

Chemical Resistance

The procedure of ASTM D1308 was used to measure chemical resistance. Several drops of each chemical agent or stain were placed on the coating and covered with a watch glass for 24 hours. After 24 hours, the chemical agent or stain was wiped off the coating with water. The coating was visually inspected for any signs of degradation, delamination, and staining. The coating was rated as a 1 (no effect) through 5 (severe staining, delamination, or degradation). Coatings of the invention preferably have a chemical resistance of at least about 4 and most preferably at least about 5. Since infinite chemical resistance would be desirable, there was no upper limit other than the limit of measurement, namely 5.

Acid Etch

For acid etch and ratings a gradient oven from Byk-Gardner, Maryland was used. The oven has a succession of rods each heated to a successively higher temperature than the previous rod, covering the range of about 30 to 100° C. The spotting and testing of the coatings was run as follows:

1) 50 µl droplets of 10 percent $H_2SO_4$ were placed on the coated panel. A pair of drops were placed ~0.5 in (1.27 cm) apart at the center of the panel. Droplets were placed along the entire length of the panel allowing ~0.25 in (0.6 cm) between each pair of drops.
2) The panel was placed on the heated test surface of the gradient oven. The panel was positioned lengthwise so that the top of the panel was aligned with the left edge of heating rod #1. The bottom edge of a 12 in (30 cm) panel will be at heating rod #28. The panel should be centered across the width of the oven surface.
3) The edge of the panel nearest the front should be marked to indicate the points of contact for each of the heating rods.
4) The gradient oven was programmed to heat the rods for 15 minutes_.
5) After the heating cycle the panel was rinsed with lukewarm tap water and dried by patting with a paper towel.
6) The temperatures of each rod were recorded and the panels were rated using the following criteria:
    5=No visible evidence of a spot
    4=Blushing or yellowing of coating; no change to touch
    3=Pinhole defect or significant loss of gloss; slight change in the surface of the coating to touch.
    2=Small blisters or bubbles present in coating.
    1=Coating was cut through to substrate, has severe bubbling or whitening.
    Panels were evaluated for the following:
        a. Temperature of $1^{st}$ visible defect (Rating=4)
        b. Temperature of severe defect (Rating=1)
        c. Rating at 60° C.
        d. Rating at 70° C.

Coatings of the invention preferably have an acid etch resistance of at least 3 at 60° C., more preferably at least 4, and most preferably 5; and acid etch resistance of at least 2 at 70° C., more preferably at least 3, and most preferably 4. Since infinite chemical resistance would be desirable, there was no upper limit other than the limit of measurement, namely 5.

Impact Resistance

Impact resistance (direct and indirect) was run according to ASTM D2794 using an impact tester from Byk-Gardner, Maryland.

The following materials were used:

NOPO-1 is a polyol based on the polymerization of methyl hydroxymethylstearate (HMS). The polyol was produced by the reaction of mixed 1,3 and 1,4-cyclohexanedimethanol commercially available from The Dow Chemical Company under the trade designation Unoxol™ (36.2 g) and methyl 9-hydroxymethylstearate (165.0 g; >90 percent purity). The reactants were charged to a 500 ml 3-neck round bottom flask, equipped with a short path condenser, receiving flask, nitrogen inlet, nitrogen outlet to mineral oil bubbler, and magnetic stirrer. The mixture was heated to 120° C. in an oil bath moderated by thermocouple controller, and kept under nitrogen atmosphere while mixing. At 120° C., the contents were degassed and backfilled with nitrogen 3 times, then catalyst (dibutyltin oxide) was added at 1000 ppm based on charge weight. The temperature was increased by 10° C. per 30 minutes until 190° C. was reached.

This temperature and conditions were held until the methanol stops coming over (usually over 4 hours). The same product was obtained by continuing the conditions overnight. At the conclusion of visible methanol evolution, the temperature was maintained for a minimum 2 hour hold. Then vacuum was applied to remove traces of methanol, drive molecular weight to the targeted level or a combination thereof. It was desirable to remove as much methanol as possible using vacuum and temperatures above 120° C.

At the conclusion of the high vacuum step (at less than 0.5 mm) the material was then cooled to 25° C. and transferred to a glass jar. The resulting viscosity, molecular weight, and hydroxyl number were evaluated and found to be 2380 cps (22° C./Spindle #34), 824 Mn, and hydroxyl number of 136.

NOPO-2 is a polyol based on the polymerization of hyroxylated fatty acid methyl esters (FAME) derived from sunflower oil. The polyol was produced by the reaction of mixed 1,3 and 1,4-cyclohexanedimethanol commercially available from The Dow Chemical Company under the trade designation Unoxol™ (478 g) and hydroxylated fatty acid methyl ester derived from sunflower oil (6200 g; average functionality 1.0 OH/FAME). The reactants were charged to a 10 l glass reactor, equipped with a short path condenser, receiving flask, nitrogen inlet, nitrogen outlet to mineral oil bubbler, and mechanical stirrer. The mixture was heated to 120° C. and kept under nitrogen atmosphere while mixing. At 120° C., the contents were degassed and backfilled with nitrogen 3 times, then catalyst (stannous octoate) was added at 500 ppm based on charge weight. The temperature was increased by 10° C. per 30 minutes until 195° C. was reached.

This temperature and conditions were held until the methanol stops coming over (usually over 4 hours). The same product was obtained by continuing the conditions overnight. At the conclusion of visible methanol evolution, the temperature was maintained for a minimum 2 hour hold. Then vacuum was applied to remove traces of methanol, drive molecular weight to the targeted level or a combination thereof. It was desirable to remove as much methanol as possible using vacuum and temperatures above 120° C.

At the conclusion of the high vacuum step (at less than 0.5 mm) the material was then cooled to 25 C and transferred to 1 gallon plastic containers. The resulting viscosity, molecular weight, and hydroxyl number were evaluated and found to be 1350 cps at 25° C., 1322 Mn, and hydroxyl number of 68.5. NOPO-2 has an average of approximately 2 hydroxyl groups/molecule.

NOPO-3 is a polyol based on the polymerization of hyroxylated fatty acid methyl esters derived from sunflower oil. The polyol was produced by the reaction of mixed 1,3 and 1,4-cyclohexanedimethanol commercially available from The Dow Chemical Company under the trade designation Unoxol™ (926 g) and hydroxylated fatty acid methyl ester derived from sunflower oil (5800 g; average functionality 1.0 OH/FAME). The reactants were charged to a 10 l glass reactor, equipped with a short path condenser, receiving flask, nitrogen inlet, nitrogen outlet to mineral oil bubbler, and mechanical stirrer. The mixture was heated to 120° C. and kept under nitrogen atmosphere while mixing. At 120° C., the contents were degassed and backfilled with nitrogen 3 times, then catalyst (stannous octoate) was added at 500 ppm based on charge weight. The temperature was increased by 10° C. per 30 minutes until 195° C. was reached.

This temperature and conditions were held until the methanol stops coming over (usually over 4 hours). The same product was obtained by continuing the conditions overnight. At the conclusion of visible methanol evolution, the temperature was maintained for a minimum 2 hour hold. Then vacuum was applied to remove traces of methanol, drive molecular weight to the targeted level or a combination thereof. It was desirable to remove as much methanol as possible using vacuum and temperatures above 120° C.

At the conclusion of the high vacuum step (at less than 0.5 mm) the material was then cooled to 25° C. and transferred to 2 one-gallon plastic containers. The resulting viscosity, molecular weight, and hydroxyl number were evaluated and found to be 1360 cps at 25° C., 1081 Mn, and hydroxyl number of 112.6. NOPO-3 has an average of approximately 2 hydroxyl groups/molecule.

NOPO-4 is a polyol based on the polymerization of hyroxylated fatty acid methyl esters derived from sunflower oil. The polyol was produced by the reaction of 1,6-hexane diol commercially available from Aldrich Chemical (368 g) and hydroxylated fatty acid methyl ester derived from sunflower oil (2900 g; average functionality 1.0 OH/FAME). The reactants were charged to a 5 l glass reactor, equipped with a short path condenser, receiving flask, nitrogen inlet, nitrogen outlet to mineral oil bubbler, and mechanical stirrer. The mixture was heated to 120° C. and kept under nitrogen atmosphere while mixing. At 120° C., the contents were degassed and backfilled with nitrogen 3 times, then catalyst (stannous octoate) was added at 500 ppm based on charge weight. The temperature was increased by 10° C. per 30 minutes until 195° C. was reached.

This temperature and conditions were held until the methanol stops coming over (usually over 4 hours). The same product was obtained by continuing the conditions overnight. At the conclusion of visible methanol evolution, the temperature was maintained for a minimum 2 hour hold. Then vacuum was applied to remove traces of methanol, drive molecular weight to the targeted level or a combination thereof. It was desirable to remove as much methanol as possible using vacuum and temperatures above 120° C.

At the conclusion of the high vacuum step (at less than 0.5 mm) the material was then cooled to 25° C. and transferred to 1 one-gallon plastic containers. The resulting viscosity, molecular weight, and hydroxyl number were evaluated and found to be 750 cps at 25° C., 968 Mn, and hydroxyl number of 115.6. NOPO-4 has an average of approximately 2 hydroxyl groups/molecule.

NOPO-5 is a polyol based on the polymerization of hyroxylated fatty acid methyl esters derived from soybean oil. The polyol was produced by the reaction of mixed 1,3 and 1,4-cyclohexanedimethanol commercially available from The Dow Chemical Co. under the trade designation Unoxol™ (7371 g) and hydroxylated fatty acid methyl ester derived from soybean oil (50000 g; average functionality 1.0 OH/FAME). The reactants were charged to an approximately 80 l stainless steel reactor, equipped with a condenser and mechanical stirrer. The mixture was heated to 120° C. and kept under nitrogen atmosphere while mixing. At 120° C., the contents were degassed and backfilled with nitrogen, then catalyst (stannous octoate) was added at 500 ppm based on charge weight. The temperature was increased by 10° C. per 30 minutes until 195° C. was reached.

This temperature and conditions were held until the methanol stops coming over (usually over 4 hours). The same product was obtained by continuing the conditions overnight. At the conclusion of visible methanol evolution, the temperature was maintained for a minimum 2 hour hold. Then vacuum was applied to remove traces of methanol, drive molecular weight to the targeted level or a combination thereof. It was desirable to remove as much methanol as possible using vacuum and temperatures above 120° C.

At the conclusion of the high vacuum step (at less than 0.5 mm) the material was then cooled to 25° C. and transferred to 3 five-gallon plastic containers. The resulting viscosity, molecular weight, and hydroxyl number were evaluated and found to be 2350 cps at 25 C, 1084 Mn, and hydroxyl number of 107.6. NOPO-5 has an average of approximately 2 hydroxyl groups/molecule.

POLY-1 is a low molecular weight polycaprolactone polyol with an hydroxyl equivalent weight of about 400 with a hydroxyl number of 140 mg/KOH/g commercially available from The Dow Chemical Company under the trade designation Tone™ 0210;

POLY-2 is a low molecular weight adipate based on 1,4-butane diol having an equivalent weight of 446, hydroxyl number of 128 mg KOH/g.

POLY-3 is a low molecular weight adipate based on neopentyl glycol having an equivalent weight of 400, hydroxyl number of 140 mg KOH/g.

MEL-1 is a monomeric melamine commercially available from Cytec Industries, New Jersey, under the trade designation Cymel™ 303, NCO-1 is an IPDI (isophorone diisocyanate) trimer available commercially from DeGussa GMBH under the trade designation Vestanat T-1890e.

CAT-1 is a catalyst commercially available from Cytec Industries, New Jersey under the trade designation Cycat™ 4040

CAT-2 is Dibutyltin Dilaurate commercially available from Air Products under the trade designation Metacure Solvent Blend is 1:1:1 by weight blend of n-butyl propionate; n-propyl propionate; and methyl isobutyl ketone.

Preparation of Acrylic Compositions

A 12 liter, round-bottom, 3-neck flask was equipped with a mechanical stirrer, thermocouple with high-temp shutoff, a nitrogen inlet, and needle inlets for feed lines from 2 separate ceramic pumping devices commercially available from FMI Corp under the trade designation model QG-20. The feed lines were designated as monomer and initiator. The reaction flask was also fitted with a Claisen adapter on the middle neck around the stir shaft, with a high-efficiency condenser fitted on the branch joint of the adapter. The condenser has an outlet to a mineral oil bubbler.

The reaction flask was charged with 800 g of solvent mixture (consisting of 55 percent amyl acetate, 42 percent xylene, and 3 percent isobutanol by weight) and the solvent was brought to reflux at 140° C. under constant nitrogen atmosphere. The pumps had been previously calibrated to deliver their reservoir contents at a predetermined rate designated hereafter, and were ready to use. The monomer reservoir was charged with monomer mixture, totaling 2400 g (as indicated in each sample in Table 1). The initiator reservoir was charged with tbutyl peroxyacetate (57.9 g) and solvent mix (560 g). Monomer and initiator are commercially available from Aldrich (Milwaukee, Wis.).

Once the solvent was at reflux temperature (140° C.) the pumps were turned on, set for a 4 hour feed (monomer=2400 g/4 hr=10 g/min; initiator=618 g/4 hr=2.6 g/min).

After the feed additions were completed the monomer line was flushed with 50 g solvent and the reaction was held at 140° C. for an additional 30 minutes. After this time, the initiator reservoir was recharged with "chaser", or additional peroxide. The t-butyl peroxyacetate (14.7 g) was mixed in with 120 g of solvent mix and then added over 30 minutes at 140° C. A 2-hour reaction time was allowed after addition was completed, after which the batch was cooled to near 80° C. and poured into glass containers.

The resulting material was evaluated for total solids (near 55-60 percent by weight) using 0.3 g at 110° C./1 hr (according to the procedure given in 40 CFR; US Office of Federal Register part 60, appendix A); and for molecular weight using Gel Permeation Chromatography (GPC) in THF (tetrahydrofuran) solvent, by comparison with polystyrene standards.

TABLE 1

PROPERTIES OF ILLUSTRATIVE ACRYLIC POLYOL COMPOSITIONS

| Acrylic Monomers | Acrylic 1 | Acrylic 2 | Acrylic 3 | Acrylic 4 | Acrylic 5 |
|---|---|---|---|---|---|
| methyl methacrylate | 40 | 20 | | | |
| 2-hydroxyethyl methacrylate | 30 | 25 | 25 | 25 | 25 |
| styrene | | 20 | 10 | | |
| isodecyl methacrylate | | 35 | 28 | 28 | 28 |
| 2-ethylhexyl methacrylate | | | 12 | 12 | 12 |
| n-butyl acrylate | 30 | | | | |
| isobornyl methacrylate | | | 25 | 35 | |
| t-butyl methacrylate | | | | | 35 |
| Weight Percent | 100 | 100 | 100 | 100 | 100 |
| $\delta_{Total}$ | 10.27 | 9.89 | 9.73 | 9.68 | 9.61 |
| $\delta_{H\text{-}Bonding}$ | 3.67 | 2.84 | 2.35 | 2.19 | 2.29 |
| $\delta_{Polar}$ | 5.56 | 4.77 | 4.36 | 4.29 | 4.57 |
| $\delta_{Non\text{-}Polar}$ | 7.67 | 7.89 | 8.03 | 8.04 | 7.82 |
| Tg | 26.2 | 26.8 | 26.0 | 26.7 | 25.9 |
| Resin Solids wt percent | 53.7 | 57.2 | 57.9 | 60.6 | 56.5 |
| Viscosity @ 20° C. using Spindle 34 (cps) | 753 | 2381 | 746 | 460 | 944 |

TABLE 2

SOLUBILITY PARAMETERS AND COMPOSITIONS OF NATURAL OIL DERIVED POLYOL COMPOSITIONS

| Seed Oil Monomers | NOPO-1 | NOPO-3 | NOPO-5 |
|---|---|---|---|
| $C_{18}$ (0 —OH) | 1 | 8 | 32 |
| $C_{18}$ (1 —OH) | 95 | 85 | 38 |
| $C_{18}$ (2 —OH) | 4 | 6 | 28 |
| $C_{18}$ (3 —OH) | 0 | 1 | 2 |
| Weight Percent | 100 | 100 | 100 |
| $\delta_{Total}$ | 8.88 | 8.88 | 8.87 |
| $\delta_{H-Bonding}$ | 2.74 | 2.67 | 2.54 |
| $\delta_{Polar}$ | 3.29 | 3.26 | 3.20 |
| $\delta_{Non-Polar}$ | 7.78 | 7.79 | 7.81 |

Coating Formulation Preparation: Formulations were prepared for the materials that pass the compatibility tests. The acrylic polyol, natural oil derived polyol, other polyols or combinations thereof were blended in a glass vial at the levels cited in the tables below representing a 2:1 acrylic polyol: natural oil derived polyol ratio based on weight solids. The materials were mixed by hand using a spatula. The solvent, melamine, and catalyst were added to the glass via at the levels cited in the tables below. The formulations were mixed by hand using a spatula. The viscosities of the formulations were determined as previously described. The coatings were applied to the panels as previously described.

TABLE 3

EXAMPLES WITH ACRYLIC POLYOL-1 FROM TABLE 1

| | EXAMPLE | | | | |
|---|---|---|---|---|---|
| | 2 Grams | 2 Grams | 3 Grams | 4 Grams | 5 Grams |
| Formulation | | | | | |
| Acrylic Polyol 1 | 11.2 | 11.2 | 11.2 | 11.2 | 11.2 |
| MEL-1 | 3.9 | 3.9 | 3.9 | 3.9 | 3.9 |
| NOPO-1 | 3 | 0 | 0 | 0 | 0 |
| NOPO-2 | 0 | 3 | 0 | 0 | 0 |
| NOPO-3 | 0 | 0 | 3 | 0 | 0 |
| NOPO-4 | 0 | 0 | 0 | 3 | 0 |
| NOPO-5 | 0 | 0 | 0 | 0 | 3 |
| CAT-1 | 0.07 | 0.07 | 0.07 | 0.07 | 0.07 |
| Solvent Blend | 0.95 | 0.95 | 0.95 | 0.95 | 0.95 |
| weight percent NV (non volatile or solids) | 62 | 62 | 62 | 62 | 62 |
| Compatibility Tests | | | | | |
| Test 2 | 2 phases, hazy Not Tested | 2 phases, hazy Not Tested | 2 phases, hazy Not Tested | 2 phases, hazy Not Tested | 2 phases, hazy Not Tested |

*CS Comparative Sample, not an example of the invention.

The data in Table 3 shows VOB polyols were not compatible with this acrylic polyol.

TABLE 4

EXAMPLES WITH ACRYLIC POLYOL-2 FROM TABLE 1

| | EXAMPLE OR COMPARATIVE SAMPLE | | | | | | |
|---|---|---|---|---|---|---|---|
| | 6 Grams | 7 Grams | 8 Grams | 9 Grams | 10 Grams | CS A* Grams | CS B* Grams |
| Formulation | | | | | | | |
| Acrylic Polyol 2 | 10.5 | 10.5 | 10.5 | 10.5 | 10.5 | 10.5 | 15.7 |
| MEL-1 | 3.9 | 3.9 | 3.9 | 3.9 | 3.9 | 3.9 | 3.9 |
| NOPO-1 | 3 | 0 | 0 | 0 | 0 | 0 | 0 |
| NOPO-2 | 0 | 3 | 0 | 0 | 0 | 0 | 0 |
| NOPO-3 | 0 | 0 | 3 | 0 | 0 | 0 | 0 |
| NOPO-4 | 0 | 0 | 0 | 3 | 0 | 0 | 0 |
| NOPO-5 | 0 | 0 | 0 | 0 | 3 | 0 | 0 |
| POLY-1 | 0 | 0 | 0 | 0 | 0 | 3 | 0 |
| CAT-1 | 0.07 | 0.07 | 0.07 | 0.07 | 0.07 | 0.07 | 0.07 |
| Solvent Blend | 3.3 | 3.3 | 3.3 | 3.3 | 3.3 | 3.3 | 1.1 |
| percent NV | 62 | 62 | 62 | 62 | 62 | 62 | 62 |
| Compatibility Tests | | | | | | | |
| Test 1 | Clear | White | White | White | White | Clear | Clear |
| Test 2 | Clear | 2 phases, hazy | slightly hazy, no separation | moderately hazy, no separation | 2 phases, hazy | Clear | Clear |
| Cured film properties | | Not Tested | | | Not Tested | | |
| dry film thickness - mils | 1.6 | | 1.6 | 1.5 | | 1.3 | 1.5 |

TABLE 4-continued

EXAMPLES WITH ACRYLIC POLYOL-2 FROM TABLE 1

| | EXAMPLE OR COMPARATIVE SAMPLE | | | | | | |
|---|---|---|---|---|---|---|---|
| | 6 Grams | 7 Grams | 8 Grams | 9 Grams | 10 Grams | CS A* Grams | CS B* Grams |
| pencil hardness | F | | HB | HB | | F | 3H |
| Universal Hardness [N/mm$^2$] | 52.3 | | 50.3 | 51.1 | | 57.6 | 162.1 |
| Vickers Hardness | 5.6 | | 5.5 | 5.5 | | 5.8 | 21.3 |
| Cross-hatch tape-adhesion | 5B | | 5B | 5B | | 5B | 5B |
| MEK (double rubs) | >200 | | >200 | >200 | | >200 | >200 |
| pendulum hardness [Konig], (sec) | 120 | | 106 | 113 | | 122 | 187 |
| viscosity @ 21° C. (cps) using Spindle 15 | 883 | | 285 | 238 | | 270 | |
| 10 percent H2SO4 | 1 | | 1 | 3 | | 1 | 3 |
| Acid Etching 1st visible defect (rating = 4) | 55 | | 55 | 55 | | 55 | |
| Acid Etching severe defect (rating = 1) | 74 | | 74 | 62 | | 69 | |
| Acid Etch Rating @ 60° C. | 3 | | 3 | 3 | | 3 | |
| Acid Etch Rating @ 70° C. | 2 | | 2 | 1 | | 1 | |
| Impact Resistance - Direct (in-lbs) | 190 | | 130 | 190 | | 170 | |
| Direct impact in SI units (Joules) | 21.5 | | 14.7 | 21.5 | | 19.2 | |
| Impact Resistance - Indirect (in-lbs) | 16 | | 8 | 32 | | 24 | |
| Indirect impact in SI units (Joules) | 1.8 | | 0.9 | 3.6 | | 2.7 | |

*CS Comparative Sample, not an example of the invention.

The data in Table 4 shows that changing the composition of the acrylic polyol with accompanying changes in solubility parameter leads to improved compatibility with some of the VOB polyols as noted in the compatibility tests. NOPO-1 was compatible with the acrylic polyol and coatings made with it have higher acid resistance than the comparative sample while maintaining hardness. Improvement in direct impact resistance and similar indirect impact resistance indicate similar flexibility with improved acid resistance.

TABLE 5

EXAMPLES WITH ACRYLIC POLYOL-3 FROM TABLE 1

| | Examples and comparative samples | | | | | | |
|---|---|---|---|---|---|---|---|
| | 11 Grams | 12 Grams | 13 Grams | 14 Grams | 15 Grams | CS C* Grams | CS D* Grams |
| Formulation | | | | | | | |
| Acrylic Polyol 3 | 10.4 | 10.4 | 10.4 | 10.4 | 10.4 | 10.4 | 15.6 |
| MEL-1 | 3.9 | 3.9 | 3.9 | 3.9 | 3.9 | 3.9 | 3.9 |
| NOPO-1 | 3 | 0 | 0 | 0 | 0 | 0 | 0 |
| NOPO-2 | 0 | 3 | 0 | 0 | 0 | 0 | 0 |
| NOPO-3 | 0 | 0 | 3 | 0 | 0 | 0 | 0 |
| NOPO-4 | 0 | 0 | 0 | 3 | 0 | 0 | 0 |
| NOPO-5 | 0 | 0 | 0 | 0 | 3 | 0 | 0 |
| POLY-1 | 0 | 0 | 0 | 0 | 0 | 3 | 0 |
| CAT-1 | 0.07 | 0.07 | 0.07 | 0.07 | 0.07 | 0.07 | 0.07 |
| Solvent Blend | 3.4 | 3.4 | 3.4 | 3.4 | 3.4 | 3.4 | 3.4 |
| percent NV | 62 | 62 | 62 | 62 | 62 | 62 | 62 |
| Compatibility Tests | | | | | | | |
| Test 1 | Clear | White slightly hazy, no separation | Clear | Clear | Clear | Clear | Clear |
| Test 2 | Clear | Clear | Clear | Clear | Clear | Clear | Clear |
| Cured Film Properties | | | | | | | |
| dry film thickness - mils | 1.5 | 1.6 | 1.6 | 1.7 | 1.6 | 1.5 | 1.5 |
| pencil hardness | HB | HB | HB | F | F | F | F |
| Universal Hardness [N/mm$^2$] | 49.1 | 39.4 | 41.3 | 33 | 44.2 | 48.2 | 138.5 |
| Vickers Hardness | 5.3 | 4.3 | 4.4 | 3.6 | 4.8 | 4.9 | 16.2 |
| cross-hatch tape-adhesion | 5B | 5B | 5B | 5B | 5B | 5B | 5B |
| Solvent Resistance (double rubs) | >200 | >200 | >200 | >200 | >200 | >200 | >200 |
| pendulum hardness [Konig], (sec) | 113 | 98 | 98 | 62 | 106 | 69 | 194 |
| Viscosity @ 21° C. (cps) using Spindle 15 | 145 | 153 | 145 | 120 | 155 | 150 | 435 |
| Acid Etching severe defect (rating = 1) | 78 | 78 | 78 | 76 | 74 | 70 | |
| Acid Etch Rating @ 70° C. | 3 | 3 | 2 | 2 | 2 | 1 | |
| Impact Resistance - Direct (in lbs) | 200 | 200 | 200 | 200 | 170 | 140 | |

TABLE 5-continued

EXAMPLES WITH ACRYLIC POLYOL-3 FROM TABLE 1

| | Examples and comparative samples | | | | | |
|---|---|---|---|---|---|---|
| | 11 Grams | 12 Grams | 13 Grams | 14 Grams | 15 Grams | CS C* Grams | CS D* Grams |
| Impact Resistance - Direct (Joules) | 22.6 | 22.6 | 22.6 | 22.6 | 19.2 | 15.8 | |
| Impact Resistance - Indirect (in lbs) | 60 | 40 | 16 | 32 | 40 | 40 | |
| Impact Resistance - indirect (Joules) | 6.8 | 4.5 | 1.8 | 3.6 | 4.5 | 4.5 | |

*CS Comparative Sample, not an example of the invention.

The data in Table 5 shows that further modification of the acrylic polyol to a polyol having closer solubility parameters leads to improved compatibility with the VOB polyols as evidenced by the compatibility results. Acid etch resistance of all VOB polyols tested was better than the comparative sample as evidenced by the acid etch rating at 70° C. Hardness as evidenced by the König method shows improved values, for most VOB polyols, over the comparative sample with improved direct impact resistance while the indirect was the same for almost all of the VOB polyols. Those skilled in the art recognize that it was difficult to increase hardness without losing flexibility using conventional polyols; however, through the incorporation of VOB polyols this was achieved.

TABLE 6

EXAMPLES WITH ACRYLIC POLYOL-4 FROM TABLE 1

| | Examples and comparative samples | | | | | | | |
|---|---|---|---|---|---|---|---|---|
| | 16 Grams | 17 Grams | 18 Grams | 19 Grams | 20 Grams | CS* E1 Grams | CS* E2 Grams | CS* E3 Grams |
| Formulation | | | | | | | | |
| Acrylic Polyol 4 | 9.9 | 9.9 | 9.9 | 9.9 | 9.9 | 9.9 | 9.9 | 9.9 |
| MEL-1 | 3.9 | 3.9 | 3.9 | 3.9 | 3.9 | 3.9 | 3.9 | 3.9 |
| NOPO-1 | 3 | 0 | 0 | 0 | 0 | 0 | 0 | 0 |
| NOPO-2 | 0 | 3 | 0 | 0 | 0 | 0 | 0 | 0 |
| NOPO-3 | 0 | 0 | 3 | 0 | 0 | 0 | 0 | 0 |
| NOPO-4 | 0 | 0 | 0 | 3 | 0 | 0 | 0 | 0 |
| NOPO-5 | 0 | 0 | 0 | 0 | 3 | 0 | 0 | 0 |
| POLY-1 | 0 | 0 | 0 | 0 | 0 | 3 | 0 | 0 |
| POLY-2 | 0 | 0 | 0 | 0 | 0 | 0 | 3 | 0 |
| POLY-3 | 0 | 0 | 0 | 0 | 0 | 0 | 0 | 3 |
| CAT-1 | 0.07 | 0.07 | 0.07 | 0.07 | 0.07 | 0.07 | 0.07 | 0.07 |
| Solvent Blend | 3.9 | 3.9 | 3.9 | 3.9 | 3.9 | 3.9 | 3.9 | 3.9 |
| percent NV | 62 | 62 | 62 | 62 | 62 | 62 | 62 | 62 |
| Compatibility Tests | | | | | | — | — | — |
| Test 1 | Clear | Hazy | Clear | Clear | Clear | Clear | Clear | Clear |
| Test 2 | Clear | Clear | Clear | Clear | Clear | Clear | Clear | Clear |
| Cured Film Properties | | | | | | | | |
| dry film thickness - mils | 1.5 | 1.5 | 1.5 | 1.6 | 1.7 | 1.5 | 1.4 | 1.4 |
| pencil hardness | HB | 2B | B | 2B | B | F | F | 2H |
| Universal Hardness [N/mm$^2$] | 37.2 | 26.7 | 24.4 | 19.7 | 28.8 | 45.3 | 35.2 | 58.4 |
| Vickers Hardness | 3.7 | 2.7 | 2.3 | 1.9 | 2.8 | 4.4 | 3.4 | 5.6 |
| cross-hatch tape-adhesion | 5B | 5B | 5B | 5B | 5B | 5B | 5B | 5B |
| Solvent Resistance (double rubs) | >200 | >200 | >200 | >200 | >200 | >200 | >200 | >200 |

TABLE 6-continued

EXAMPLES WITH ACRYLIC POLYOL-4 FROM TABLE 1

Examples and comparative samples

| | 16 Grams | 17 Grams | 18 Grams | 19 Grams | 20 Grams | CS* E1 Grams | CS* E2 Grams | CS* E3 Grams |
|---|---|---|---|---|---|---|---|---|
| pendulum hardness [Konig], (sec) | 92 | 76 | 71 | 63 | 76 | 105 | 101 | 123 |
| Viscosity @ 21° C. (cps) using Spindle 15 | 115 | 115 | 111 | 107 | 133 | 89 @ 20° C. | 89 @ 24° C. using spindle 34 | 63 @ 24° C. using spindle 34 |
| Acid Etching severe defect (rating = 1) | 78 | 74 | 78 | 74 | 78 | 70 | 70 | 70 |
| Acid Etch Rating @ 70° C. | 3 | 2 | 3 | 2 | 3 | 1 | 1 | 1 |
| Impact Resistance - Direct (lbs) | 200 | 200 | 200 | 200 | 200 | 190 | 200 | 180 |
| Direct Impact resistance in joules | 22.6 | 22.6 | 22.6 | 22.6 | 22.6 | 21.5 | 22.6 | 20.3 |
| Impact Resistance - Indirect (lbs) | 90 | 100 | 40 | 200 | 16 | 90 | 170 | 40 |
| Indirect impact resistance in Joules | 10.2 | 11.3 | 4.5 | 22.6 | 1.8 | 10.2 | 19.2 | 4.5 |

*CS Comparative Sample, not an example of the invention.

The data in Table 6 shows further modification of the acrylic polyol to modify the solubility parameters leads to improved compatibility with the VOB polyols as evidenced by the compatibility results. Acid etch resistance of all VOB polyols tested is better than the comparative sample as evidenced by the acid etch rating at 70° C.

TABLE 7

EXAMPLES WITH ACRYLIC POLYOL-5 FROM TABLE 1

Examples and comparative samples

| | 21 Grams | 22 Grams | 23 Grams | 24 Grams | 25 Grams | CS* F1 Grams | CS* F2 Grams | CS* F3 Grams |
|---|---|---|---|---|---|---|---|---|
| Formulation | | | | | | | | |
| Acrylic Polyol 5 | 10.6 | 10.6 | 10.6 | 10.6 | 10.6 | 10.6 | 10.6 | 10.6 |
| MEL-1 | 3.9 | 3.9 | 3.9 | 3.9 | 3.9 | 3.9 | 3.9 | 3.9 |
| NOPO-1 | 3 | 0 | 0 | 0 | 0 | 0 | 0 | 0 |
| NOPO-2 | 0 | 3 | 0 | 0 | 0 | 0 | 0 | 0 |
| NOPO-3 | 0 | 0 | 3 | 0 | 0 | 0 | 0 | 0 |
| NOPO-4 | 0 | 0 | 0 | 3 | 0 | 0 | 0 | 0 |
| NOPO-5 | 0 | 0 | 0 | 0 | 3 | 0 | 0 | 0 |
| POLY-1 | 0 | 0 | 0 | 0 | 0 | 0 | 3 | 0 |
| POLY-2 | 0 | 0 | 0 | 0 | 0 | 0 | 0 | 3 |
| POLY-3 | 0 | 0 | 0 | 0 | 0 | 3 | 0 | 0 |
| CAT-1 | 0.07 | 0.07 | 0.07 | 0.07 | 0.07 | 0.07 | 0.07 | 0;07 |
| Solvent Blend | 3.2 | 3.2 | 3.2 | 3.2 | 3.2 | 3.2 | 3.2 | 3.2 |
| percent NV | 62 | 62 | 62 | 62 | 62 | 62 | 62 | 62 |
| Compatibility Tests | | | | | | — | — | — |
| Test 1 | Clear | Clear | Clear | Clear | Clear | Clear | Clear | Clear |
| Test 2 | Clear | Clear | Clear | Clear | Clear | Clear | Clear | Clear |
| Cured Film Properties | | | | | | | | |
| dry film thickness - mils | 1.4 | 1.5 | 1.4 | 1.4 | 1.5 | 1.5 | 1.5 | 1.5 |
| pencil hardness | F | HB | HB | HB | HB | F | F | 2H |
| Universal Hardness [N/mm$^2$] | 50.3 | 47.5 | 45.1 | 45.8 | 55 | 50.1 | 49.1 | 66.3 |
| Vickers Hardness | 5.4 | 5.2 | 4.8 | 5 | 6.3 | 5.1 | 4.8 | 6.5 |
| cross-hatch tape-adhesion | 5B | 5B | 5B | 5B | 5B | 5B | 5B | 4B |
| Solvent Resistance (double rubs) | >200 | >200 | >200 | >200 | >200 | >200 | >200 | >200 |

TABLE 7-continued

EXAMPLES WITH ACRYLIC POLYOL-5 FROM TABLE 1

| | Examples and comparative samples | | | | | | | |
|---|---|---|---|---|---|---|---|---|
| | 21 Grams | 22 Grams | 23 Grams | 24 Grams | 25 Grams | CS* F1 Grams | CS* F2 Grams | CS* F3 Grams |
| pendulum hardness [konig], (sec) | 108 | 111 | 108 | 108 | 111 | 112 | 111 | 121 |
| Viscosity @ 20° C. (cps) using Spindle 15 | 143 | 160 | 143 | 140 | 162 | 160 | 173 @ 24° C. using spindle 34 | 122 @ 24° C. using spindle 34 |
| Acid Etching severe defect (rating = 1) | 78 | 74 | 78 | 76 | 78 | 67 | 67 | 67 |
| Acid Etch Rating @ 70° C. | 3 | 3 | 3 | 2 | 3 | 1 | 1 | 1 |
| Impact Resistance - Direct (lbs) | 200 | 200 | 200 | 200 | 200 | 190 | 200 | 150 |
| In Joules | 22.6 | 22.6 | 22.6 | 22.6 | 22.6 | 21.5 | 22.6 | 16.9 |
| Impact Resistance - Indirect (lbs) | 90 | 80 | 50 | 60 | 32 | 8 | 40 | 24 |
| In joules | 10.2 | 9.0 | 5.6 | 6.8 | 3.6 | 0.9 | 4.5 | 2.7 |

*CS Comparative Sample, not an example of the invention.

The data in Table 7 shows further modification of the acrylic polyol to modify the solubility parameters leads to improved compatibility with the VOB polyols as evidenced by the compatibility results. Acid etch resistance of all VOB polyols tested was better than the comparative sample as evidenced by the acid etch rating at 70° C. Direct impact resistance was similar for all VOB polyols tested and the comparative samples; however, significant improvement with most of the VOB polyols as compared with the comparative samples was achieved without sacrificing hardness.

Acrylic Polyol/VOB Polyol Blend Viscosity Measurements

The viscosity of each formulation was tested using a programmable rheometer commercially available from Brookfield, Mass. under the trade designation DV-III using spindle 34. The speed was selected to maintain a torque reading between 20-80 percent. The temperature was recorded for each formulation.

The acrylic polyol and VOB polyol were blended at a 1:1 ratio based on solids. The solids level of the blends are listed in the table and were adjusted by adding the solvent blend previously described. The highest solids blends listed in the table contain no additional solvent than what was introduced from the acrylic polyol.

These tables show that the VOB polyols were more effective at reducing the viscosity of the blends than the caprolactone or adipate polyester materials. This means that transparent and high solids (low volatiles) formulations were more readily formed.

Polyisocyanate Cured Coatings

Examples 34-35 and Comparative Sample I

The polyol (acrylic 4 and NOPO-5) resins were formulated to a viscosity of 50 centipoise and spray applied onto iron phosphate cold rolled steel panels. NCO-1 was used as the crosslinker, utilizing a stoichiometry of 1:1 NCO to OH. Dibutyl tin dilaurate (DBTDL) was utilized as the catalyst at 0.02 weight percent, based on solids. The coatings were baked at 120° C. for 120 minutes to give a dry film thickness of approximately 2.5 mils ($6.4 \times 10^{-5}$ m).

Coatings were prepared using a 50:50 ratio and a 70:30 ratio of NOP-5 to acrylic polyol 4 and the properties of these coatings are compared coatings formed using the acrylic polyester polyol without other polyol. The formulations containing NOPO-5 had higher solids and hence lower VOCs at

TABLE 8

EXAMPLES WITH ACRYLIC POLYOL 4

| Blend Solids | Ex 26 NOPD-1 cps | Ex 27 NOPD-3 cps | Ex 28 NOPD-4 cps | Ex 29 NOPD-5 cps | CS* G1 POLY-1 cps | CS* G2 POLY-2 cps | CS* G3 POLY-3 cps |
|---|---|---|---|---|---|---|---|
| 75.45 percent | 608 | 541 | 440 | 693 | 530 | Solid | 708 |
| 70 percent | 280 | 248 | 206 | 314 | 262 | 595 | 317 |
| 65 percent | 140 | 124 | 105 | 158 | 129 | 317 | 158 |
| Comments | Clear | Clear | Slight Haze | Clear | White | White | Clear |

TABLE 9

EXAMPLES WITH ACRYLIC POLYOL 5

| Blend Solids | Ex 30 NOPD-1 cps | Ex 31 NOPD-3 cps | Ex 32 NOPD-4 cps | Ex 33 NOPD-5 cps | CS* H1 POLY-1 cps | CS* H2 POLY-2 cps | CS* H3 POLY-3 cps |
|---|---|---|---|---|---|---|---|
| 72.20 percent | 847 | 721 | 617 | 1052 | 606 | 1675 | 960 |
| 70 percent | 672 | 594 | 480 | 765 | 437 | 906 | 680 |
| 65 percent | 288 | 265 | 224 | 347 | 204 | 444 | 296 |
| Comments | Clear | Clear | Slight Haze | Clear | White | White | Clear |

*CS Comparative Sample, not an example of the invention.

the spray application viscosity of 50 cps. The higher the level of NOPO-5, the lower was the VOC of the coating formulation. The pencil hardness of the coating containing a 70:30 (NOPP-5 to acrylic 4) was lower than the 50:50 (NOP-5 to acrylic 4) and the coating formed using acrylic polyester polyol alone. The incorporation of NOPO-5 leads to significant improvements in adhesion and flexibility of the coatings.

TABLE 12

ACRYLIC POLYOL 4/VOB POLYOL COATING FORMULATION DATA

| | Examples and Comparative Examples | | |
|---|---|---|---|
| | 42 NOPO-5/ Acrylic 4 (50:50) | 43 NOPO-5/ Acrylic 4 (70:30) | ? 100 Acrylic 4 |
| Formulation Pot Life (hrs) | 5.0 | 2.5 | 3.0 |
| Formulation Solids (weight percent) @ 50 cps | 65.0 | 69.1 | 56.6 |
| VOC (lbs/gallon) | 2.87 | 2.53 | 3.58 |
| Pencil Hardness | F | 2B | F |
| Specular Gloss 60 degree/20 degree | 123/105 | 123/106 | 119/104 |
| Cross-hatch Adhesion | 5B | 5B | 1B |
| Impact Flexibility | 50 | 160 | 15 |
| Direct Impact (in-lb) | <10 | 160 | <5 |
| Reverse Impact (in-lb) | | | |
| Direct impact in Joules | 442 | 1416 | 132 |
| Reverse impact in Joules | <89 | 1416 | <44 |

Embodiments of the Invention

1. A polymer composition comprising:
   a. a binder component which comprises (1) 5 to 100 weight percent of at least one natural oil derived polyol having at least about 50 percent primary hydroxyl groups and (2) sufficient additional polyol different from a natural oil derived polyol to make 100 percent wherein the natural oil derived polyol has an average of from 1.5 to 3 hydroxyl groups per molecule and an equivalent weight of from 200 to 5000; and
   b. a crosslinking component reactive with hydroxyl groups.
2. A process for producing a coating, adhesive, binder or combination thereof on the surface of a substrate, the process comprising, in any order:
   (a) admixing binder and crosslinking components of a composition to form an admixture, wherein a binder component comprises the binder composition listed in any preceding or following embodiment; and a crosslinking component which comprises the crosslinking composition listed in any preceding or following embodiment; and
   (b) applying a layer of said admixture on said surface.
3. The process of any previous embodiment wherein the process additionally includes (c) curing said layer to form said coating on said surface of said substrate.
4. The process of any previous embodiment wherein the coating is heated to a temperature of at least about 80° C. to 60 or 200° C.
5. A coating, adhesive binder or combination thereof prepared from a composition or prepared using a process of any of the preceding embodiments.
6. The coating, adhesive binder of embodiment 5 which is a coating.
7. The coating, adhesive binder of embodiment 5 which is an adhesive.
8. The coating, adhesive binder of embodiment 5 which is a binder.
9. An article comprising a composition, coating, adhesive, binder or combination thereof of any of the preceding or following embodiments. Such articles include laminates.
10. The composition, process, coating, adhesive, binder or combination thereof or article of any of the preceding embodiments wherein at least one natural oil derived polyol is a VOB polyol, preferably wherein the VOB polyol or combination thereof comprises at least about any of 50, 75, 85, 90, 95, 97, 99 percent by weight of the natural oil derived polyol or polyols in the binder component.
11. The composition, process, coating, adhesive, binder or combination thereof or article of any of the preceding embodiments wherein the crosslinking component is selected from the group consisting of polyisocyanates having at least two reactive isocyanate groups, phenolics, cycloaliphatic epoxides. aminoplast resins or combinations thereof, preferably selected from the group consisting of aminoplast resins, polyisocyanates or combinations thereof.
12. The composition, process, coating, adhesive, binder or combination thereof or article of any of the preceding embodiments wherein the aminoplast is a melamine formaldehyde resin, a urea formaldehyde resin or a combination thereof.
13. The composition, process, coating, adhesive, binder or combination thereof or article of any of the preceding embodiments wherein the binder composition, the crosslinking composition, the coating, adhesive, binder or combination thereof composition or any combination thereof additionally includes a solvent for any one or more of the polyols or crosslinking components.
14. The composition, process, coating, adhesive, binder or combination thereof or article of any of the preceding embodiments wherein the binder composition is present in a solvent at a solids content of at least about any of 60 weight percent polyol in a solvent.
15. The composition, process, coating, adhesive, binder or combination thereof or article of any of the preceding embodiments wherein the natural oil derived polyol and the additional polyol have Hoy solubility parameters wherein the calculated Hoy solubility parameter of the natural oil derived polyol differs from that of the additional polyol by at most about any of 1.5, 1, 075, 0.5 or 0.25 units, alternatively wherein there are more than one of either or both natural oil derived polyol or additional polyol, each having Hoy solubility parameters wherein the calculated Hoy solubility parameter of at least one natural oil derived polyol and at least one additional polyol differ by at most about any of 1.5, 1, 075, 0.5 or 0.25 units, preferably wherein the polyols having Hoy solubility parameters differing as stated comprise the majority of each of the natural oil derived polyols and the additional polyols; most preferably wherein at least any of 50, 60, 70, 80, 90, 95 or 100 weight percent of all the polyols used in making the coating, adhesive, binder or combination thereof have Hoy solubility parameters differing by at most about any of 1.5, 1, 075, 0.5 or 0.25 units.

16. The composition of any of the preceding embodiments wherein the binder component comprises at least one natural oil derived polyol and other polyols wherein each of the other polyols that are present in amounts greater than about 5 weight percent of the binder component have calculated Hoy solubility parameters differing from that of the natural oil derived polyol by at most about any of 1.5 1, 075, 0.5 or 0.25 units, wherein the other polyols are selected from natural oil derived polyols, additional polyols and combinations thereof.

17. The composition of embodiment 16 wherein the natural oil polyol from which the difference in Hoy solubility parameter is measured is a natural oil polyol present in an amount greater than or equal to the amount of any other natural oil derived polyol present, preferably present in an amount of at least about 50 weight percent of the combined weight of all natural oil derived polyols present.

18. The composition, process, coating, adhesive, binder or combination thereof or article of any of the preceding embodiments wherein at least one, preferably all the natural oil derived polyols have a number average molecular weight of preferably at most about 2000 Daltons.

19. The composition, process, coating, adhesive, binder or combination thereof or article of any of the preceding embodiments wherein at least one natural oil derived polyol with a viscosity of at most about 100 centipoise, independently at most about any of 10,000, 5000, or 1000 at a solids content of at least about 50, preferably 60 weight percent polyol in a solvent 20. The composition, process, coating, adhesive, binder or combination thereof or article of any of the preceding embodiments wherein the coating, adhesive, binder or combination thereof composition is optionally a one-package composition wherein the binder component and crosslinking component are blended together as packaged or a two-pack composition wherein the crosslinking component is mixed with the binder component just before application to a substrate.

21. The composition, process, coating, adhesive, binder or combination thereof or article of any of the preceding embodiments wherein the natural oil derived polyol or combination thereof has an average of at least about any of 1.5, 1.75 or 2, and preferably at most about any of 3, 2.75, or 2.5 hydroxyl groups per molecule.

22. The composition, process, coating, adhesive, binder or combination thereof or article of any of the preceding embodiments wherein the hydroxyl equivalent weight of the natural oil derived polyol is at least about any of 200, 400, 600 and preferably at most about any of 5000, 1500, 1000.

23. The composition, process, coating, adhesive, binder or combination thereof or article of any of the preceding embodiments wherein the initiator used to make an initiated fatty acid polyol or VOB polyol contains two or more hydroxyl, primary amine or secondary amine groups.

24. The composition, process, coating, adhesive, binder or combination thereof or article of any of the preceding embodiments wherein the initiator used to make an initiated fatty acid polyol or VOB polyol is an alkanol amine, a polyamine or combination thereof.

25. The composition, process, coating, adhesive, binder or combination thereof or article of any of the preceding embodiments wherein the initiator has at least about any of 1 or 2 hydroxyl groups, amine groups or a combination thereof and preferably at most about any of 6, 4, or 3, most preferably 2 hydroxyl or amine groups or a combination thereof per molecule, more preferably hydroxyl groups.

26. The composition, process, coating, adhesive, binder or combination thereof or article of any of the preceding embodiments wherein the initiator is a polyol.

27. The composition, process, coating, adhesive, binder or combination thereof or article of any of the preceding embodiments wherein the initiator has a molecular weight of at least about any of 32 or 116, preferably at most about any of 550, 5000, 1000, or 10000 Daltons.

28. The composition, process, coating, adhesive, binder or combination thereof or article of any of the preceding embodiments wherein the initiator is selected from ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethyllol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and combinations thereof.

29. The composition, process, coating, adhesive, binder or combination thereof or article of any of the preceding embodiments wherein the natural oil derived polyol is prepared by reacting a hydroxymethyl group containing fatty acid alkyl ester composition having an average of at least about any of 0.5, 0.75, 1.0, and preferably at most about any of 2, 1.75, or 1.5 hydroxymethyl groups per hydroxymethyl fatty acid ester.

30. The composition, process, coating, adhesive, binder or combination thereof or article of any of the preceding embodiments wherein the natural oil derived polyol used with at least one additional polyol different from natural oil derived polyol.

31. The composition, process, coating, adhesive, binder or combination thereof or article of any of the preceding embodiments wherein the additional polyol is selected from at least one acrylic polyol, at least one polyester polyol, at least one polycarbonate polyol, at least one polyurethane polyol, at least one polyether polyol, or a combination thereof.

32. The composition, process, coating, adhesive, binder or combination thereof or article of any of the preceding embodiments wherein the additional polyol is a (meth) acrylic polyol.

33. The composition, process, coating, adhesive, binder or combination thereof or article of any of the preceding embodiments wherein the additional polyol is a (meth) acrylic polyol having the number average molecular weight of advantageously at least about any of 400 or 500, preferably at most about any of 10000 or 20000, 34. The composition, process, coating, adhesive, binder or combination thereof or article of any of the preceding embodiments wherein the additional polyol has at least about any of 2 to at most any of about 10, 6 or 4 hydroxyl functional groups per molecule, of which preferably at least about 2 and preferably at most about 4 are primary hydroxyl groups.

35. The composition, process, coating, adhesive, binder or combination thereof or article of any of the preceding embodiments wherein the (meth)acrylic polyol is a polymer of polymerizable esters of unsaturated acid monomers containing a hydroxyl group or a polymer thereof with one or more other α,β-unsaturated monomers.

36. The composition, process, coating, adhesive, binder or combination thereof or article of any of the preceding embodiments wherein the (meth)acrylic polyol is a polymer of at least one alkyl (meth)acrylate monomer, preferably having 1 to 18 carbon atoms in the alkyl group or from at least one (meth)acrylic monomer and at least one hydroxy functional monomer.

37. The composition, process, coating, adhesive, binder or combination thereof or article of any of the preceding embodiments wherein the (meth)acrylic polyol is a polymer of at least one member selected from hydroxy alkyl (meth)acrylates having 1 to 4 carbon atoms in the alkyl group, an ethylenically polymerized silane, such as, trimethoxy propyl silyl methacrylate; or tertiarybutylaminoethyl methacrylate or a combination thereof.

38. The composition, process, coating, adhesive, binder or combination thereof or article of any of the preceding embodiments wherein the other α,β-unsaturated monomers are selected from methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, isobutyl acrylate, isobutyl methacrylate, sec-butyl acrylate, sec-butyl methacrylate, cyclohexyl acrylate, cyclohexyl methacrylate, 2-ethylhexyl acrylate, 2-ethylhexyl methacrylate, stearyl acrylate, stearyl methacrylate, lauryl acrylate, lauryl methacrylate, styrene, α-methylstyrene, p-vinyltoluene, or acrylonitrile and combinations thereof.

39. The composition, process, coating, adhesive, binder or combination thereof or article of any of the preceding embodiments wherein the additional polyol includes at least one polyester polyol.

40. The composition, process, coating, adhesive, binder or combination thereof or article of any of the preceding embodiments wherein the additional polyol is a polyester polyol which is a reaction product of at least one polyols, preferably at least one diol, with at least one polycarboxylic acid or anhydrides thereof, preferably at least one dicarboxylic acid, dicarboxylic acid anhydride or combination thereof.

41. The composition, process, coating, adhesive, binder or combination thereof or article of any of the preceding embodiments wherein the additional polyol is a polyester polyol wherein at least one polycarboxylic acid or anhydride is aliphatic, cycloaliphatic, aromatic, heterocyclic or a combination thereof and is optionally substituted or unsubstituted, and independently saturated or unsaturated.

42. The composition, process, coating, adhesive, binder or combination thereof or article of any of the preceding embodiments wherein the additional polyol is a polyester polyol wherein at least one polycarboxylic acid or anhydride is selected from succinic acid, adipic acid, terephthalic acid, isophthalic acid, trimellitic anhydride, phthalic anhydride, maleic acid, maleic acid anhydride and fumaric acid or combinations thereof.

43. The composition, process, coating, adhesive, binder or combination thereof or article of any of the preceding embodiments wherein the additional polyol is a polyester polyol wherein at least one polyol used in making the polyester polyols has an equivalent weight of at most about 150.

44. The composition, process, coating, adhesive, binder or combination thereof or article of any of the preceding embodiments wherein the additional polyol is a polyester polyol wherein at least one polyol used to making the polyester is selected from ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethyllol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol, at least one polycaprolactone polyol and combinations thereof.

45. The composition, process, coating, adhesive, binder or combination thereof or article of any of the preceding embodiments wherein the binder composition comprises at least one polyol is a polyester polyol different from a VOB polyol having a molecular weight of at least about 400 to at most about 20,000.

46. The composition, process, coating, adhesive, binder or combination thereof or article of any of the preceding embodiments wherein the binder composition comprises at least one polyol is a polyester polyol having a Tg in the range of $-50°$ C. to $+100°$ C.

47. The composition, process, coating, adhesive, binder or combination thereof or article of any of the preceding embodiments wherein the binder composition comprises at least one polyol is a polyester polyol having an average at least about any of 1, 2, or 4 primary hydroxyl groups per molecule.

48. The composition, process, coating, adhesive, binder or combination thereof or article of any of the preceding embodiments wherein the binder composition comprises at least one polyol which is a polyether polyol, preferably a polymer of one or more alkylene oxides, more preferably ethylene oxide, propylene oxide and 1,2-butylene oxide, or mixtures thereof.

49. The composition, process, coating, adhesive, binder or combination thereof or article of any of the preceding embodiments wherein the binder composition comprises at least one polyol which is a polyether polyol which is a polypropylene oxide or polymer of a mixture of propylene oxide and ethylene oxide or a combination thereof.

50. The composition, process, coating, adhesive, binder or combination thereof or article of any of the preceding embodiments wherein the binder compositions comprise at least one natural oil derived polyol with at least one additional polyol wherein the natural oil derived polyol is miscible with the other polyol or polyols in the coating, adhesive, binder or combination thereof composition.

51. the composition, process, coating, adhesive, binder or combination thereof or article of any of the preceding embodiments wherein the binder compositions comprise at least one natural oil derived polyol with at least one additional polyol wherein the difference in the calculated total solubility parameters is at most about any of 1.0, 0.75, 0.5, or 0 or the difference in the three dimensional components of the solubility parameter is at most about any of 1.0, 0.75, 0.5, or 0 or a combination of both.

52. The composition, process, coating, adhesive, binder or combination thereof or article of any of the preceding embodiments wherein the binder compositions comprise at least one natural oil derived polyol with at least one additional polyol wherein the additional polyol is a (meth)acrylic polyol.

53. The composition, process, coating, adhesive, binder or combination thereof or article of any of the preceding embodiments wherein at least one additional polyol wherein the (meth)acrylic polyol having a number average molecular weight of at least about any of 500, 1000, 1500, 2000 and preferably at most about any of 5000, 10000, 20000, or 100000, a Tg of at least about any of −50, −25, −10, 0 and preferably at most about any of 30, 50, 75, or 100° C.

54. The composition, process, coating, adhesive, binder or combination thereof or article of any of the preceding embodiments wherein the composition of the present invention includes a crosslinking component selected from the group consisting of at least one polyisocyanate having at least two reactive isocyanate groups, at least one melamine and combinations thereof.

55. The composition, process, coating, adhesive, binder or combination thereof or article of any of the preceding embodiments wherein the crosslinking component includes at least one polyisocyanate which has an average of at least about any of 2, 2.5, 2.7, or 3 and preferably at most about any of 4, 3.75, 3.50, 3.25 isocyanate functionalities per molecule.

56. The composition, process, coating, adhesive, binder or combination thereof or article of any of the preceding embodiments wherein the composition has a mole ratio of isocyanate groups on the polyisocyanate in the crosslinking component to hydroxyl groups of the total polyol of at least about any of 0.90, 0.95, 1.0 preferably to at most about any of 1.10, 1.05, 1.03 or 1.01.

57. The composition, process, coating, adhesive, binder or combination thereof or article of any of the preceding embodiments wherein the polyisocyanate is aromatic, aliphatic or cycloaliphatic, is independently at least one di-, tri- or tetra-isocyanate or combination thereof, independently optionally includes isocyanurate structural units, or a combination thereof.

58. The composition, process, coating, adhesive, binder or combination thereof or article of any of the preceding embodiments wherein the crosslinking component comprises at least one compound selected from the isocyanurate of hexamethylene diisocyanate, the isocyanurate of isophorone diisocyanate, the isocyanurate of 1,3-cyclohexanebis(isocyanatomethyl), the isocyanurate of 1,4-cyclohexanebis(isocyanatomethyl) and the isocyanurate of a mixture of 1,3- and 1,4-cyclohexanebis(isocyanatomethyl); the adduct of 2 molecules of a diisocyanate, such as, hexamethylene diisocyanate; uretidiones of hexamethylene diisocyanate; uretidiones of isophorone diisocyanate or isophorone diisocyanate; isocyanurate of meta-tetramethylxylylene diisocyanate; and a diol such as, ethylene glycol, 1,2-propylene diisocyanate, trimethylene diisocyanate, tetramethylene diisocyanate, 2,3-butylene diisocyanate, hexamethylene diisocyanate, octamethylene diisocyanate, 2,2,4-trimethyl hexamethylene diisocyanate, 2,4,4-trimethyl hexamethylene diisocyanate, dodecamethylene diisocyanate, omega, omega-dipropyl ether diisocyanate, 1,3-cyclopentane diisocyanate, 1,2-cyclohexane diisocyanate, 1,4-cyclohexane diisocyanate, isophorone diisocyanate, 1,3-cyclohexanebis(isocyanatomethyl), 1,4-cyclohexanebis(isocyanatomethyl), mixture of 1,3- and 1,4-cyclohexanebis(isocyanatomethyl), 4-methyl-1,3-diisocyanatocyclohexane, trans-vinylidene diisocyanate, dicyclohexyl methane-4,4[prime]-diisocyanate, 3,3[prime]-dimethyldicyclohexylmethane-4,4[prime]-diisocyanate, a toluene diisocyanate, 1,3-bis(1-isocyanato 1-methylethyl)benzene, 1,4-bis(1-isocyanato-1-methylethyl)benzene, 1,3-bis(isocyanatomethyl)benzene, xylene diisocyanate, 1,5-dimethyl-2,4-bis(isocyanatomethyl)benzene, 1,5-dimethyl-2,4-bis(2-isocyanatoethyl)benzene, 1,3,5-triethyl-2,4-bis(isocyanatomethyl)benzene, 4,4[prime]-diisocyanatodiphenyl, 3,3[prime]-dichloro-4,4[prime]-diisocyanatodiphenyl, 3,3[prime]-diphenyl-4,4[prime]-diisocyanatodiphenyl, 3,3[prime]-dimethoxy-4,4[prime]-diisocyanatodiphenyl, 4,4[prime]-diisocyanatodiphenylmethane, 3,3[prime]-dimethyl-4,4[prime]-diisocyanatodiphenyl methane, a diisocyanatonaphthalene, polyisocyanates having isocyanurate structural units, the adduct of 2 molecules of a diisocyanate, such as, hexamethylene diisocyanate or isophorone diisocyanate, and a diol such as ethylene glycol, the adduct of 3 molecules of hexamethylene diisocyanate and 1 molecule of water, the adduct of 1 molecule of trimethylol propane and 3 molecules of toluene diisocyanate, the adduct of 1 molecule of trimethylol propane and 3 molecules of isophorone diisocyanate, 1,3,5-triisocyanato benzene and 2,4,6-triisocyanatotoluene, the adduct of 1 molecule of pentaerythritol and 4 molecules of toluene diisocyanate and combinations thereof.

59. The composition, process, coating, adhesive, binder or combination thereof or article of any of the preceding embodiments wherein at least a portion of the isocyanate functionalities of the polyisocyanate are capped with a monomeric alcohol to prevent premature crosslinking.

60. The composition, process, coating, adhesive, binder or combination thereof or article of any of the preceding embodiments wherein the coating, adhesive, binder or combination thereof is clear or pigmented, independently a mono-coat or a basecoat 61. The composition, process, coating, adhesive, binder or combination thereof or article of any of the preceding embodiments wherein the crosslinking component comprises at least one melamine formaldehyde resin, preferably at least one alkoxy monomeric melamine.

62. The composition, process, coating, adhesive, binder or combination thereof or article of any of the preceding embodiments wherein the crosslinking component comprises at least one alkylated melamine, methylated, butylated, isobutylated melamine; hexamethylol melamine, trimethylol melamine, partially methylated hexamethylol melamine, pentamethoxymethyl melamine or combination thereof.

63. The composition, process, coating, adhesive, binder or combination thereof or article of any of the preceding embodiments wherein the crosslinking component comprises at least one at least one melamine and contains at least about any of 10, 15, 20, or 30 and preferably at most about any of 50, 45, 40, 35 weight percent melamine based on the total weight of the binder and crosslinking components solids.

64. The composition, process, coating, adhesive, binder or combination thereof or article of any of the preceding embodiments wherein coating, adhesive, binder or combination thereof composition additionally comprises at least one catalyst to facilitate reaction of the binder and crosslinking components, thus facilitate curing, preferably wherein at least one catalyst is selected from an aromatic sulfonic acid, dodecylbenzene sulfonic acid, para-toluenesulfonic acid, dinonyinaphthalene sulfonic acid, each of which is independently optionally unblocked or blocked, a strong acid, phosphoric acid, phenyl acid phosphate, each of which is independently optionally unblocked or blocked; a tin compound, dibutyl tin dilaurate, dibutyl tin diacetate, stannous octoate, and dibutyl tin oxide, tertiary amine or a combination thereof.

65. The composition, process, coating, adhesive, binder or combination thereof or article of any of the preceding embodiments wherein coating, adhesive, binder or combination thereof composition additionally comprises at least one organic solvent, preferably selected from the group consisting of aromatic hydrocarbons, ketones, esters and combinations thereof; more preferably selected from the group consisting of petroleum naphtha, xylenes; methyl amyl ketone, methyl isobutyl ketone, methyl ethyl ketone, acetone; butyl acetate or hexyl acetate, glycol ether esters, propylene glycol monomethyl ether acetate and combinations thereof.

66. The composition, process, coating, adhesive, binder or combination thereof or article of any of the preceding embodiments wherein the coating, adhesive, binder or combination thereof composition has a solids level at least about any of 50, 60, 70, or 80 preferably to at most about any of 85, 90, 95, or 100, percent based on the total weight of the coating, adhesive, binder or combination thereof composition.

67. The composition, process, coating, adhesive, binder or combination thereof or article of any of the preceding embodiments wherein the coating, adhesive, binder or combination thereof composition additionally comprises at least one ultraviolet light stabilizer, absorber or combination thereof, preferably present in an amount of at least about any of 0.1, 1, 1.5, more preferably to at most about any of 5, 2.5, or 2 weight percent based on weight of binder and crosslinking components solids, most preferably where the stabilizer or absorber is selected from at least one ultraviolet light absorber, screener, quencher and specific hindered amine light stabilizer or combination thereof.

68. The composition, process, coating, adhesive, binder or combination thereof or article of any of the preceding embodiments wherein the coating, adhesive, binder or combination thereof composition additionally comprises at least one antioxidant, preferably in an amount of at least about 0.1 more preferably to at most about 5 percent by weight, based on the total weight of binder and crosslinking components solids.

69. The composition, process, coating, adhesive, binder or combination thereof or article of any of the preceding embodiments wherein the coating, adhesive, binder or combination thereof composition additionally comprises at least one additive, preferably selected from stabilizers, rheology control agents, flow agents, pigments toughening agents, fillers and combinations thereof.

70. The composition, process, coating, adhesive, binder or combination thereof or article of any of the preceding embodiments wherein the coating, adhesive, binder or combination thereof composition additionally contains at least one pigment, preferably with total pigment amount being from 0.1 percent to 200 percent by weight, based on the total weight of the binder and crosslinking component solids.

71. The composition, process, coating, adhesive, binder or combination thereof or article of any of the preceding embodiments wherein the coating, adhesive, binder or combination thereof composition is supplied in the form of a two-pack coating, adhesive, binder or combination thereof composition in which a first-pack includes the binder component and a second pack includes the crosslinking component containing polyisocyanate or melamine or, independently, in the form of one pack coating, adhesive, binder or combination thereof composition in which both components are supplied or stored in the same container in the form of a one-pack coating, adhesive, binder or combination thereof composition 72. The composition, process, coating, adhesive, binder or combination thereof or article of any of the preceding embodiments wherein the curing occurs in one stage either at ambient or higher temperatures or in two or more stages wherein the first stage takes place under ambient conditions and the second stage takes place at elevated temperatures, preferably baking temperatures.

73. The composition, process, coating, adhesive, binder or combination thereof or article of any of the preceding embodiments wherein the coating, adhesive, binder or combination thereof is heated to a temperature of at least about 80° C. and preferably up to either 160 or 200° C., more preferably for a time of from 10 to 60 minutes.

74. The composition, process, coating, adhesive, binder or combination thereof or article of any of the preceding embodiments wherein the coating, adhesive, binder or combination thereof has a thickness advantageously in the range of from 25 micrometers to 75 mlcrometers.

75. The composition, process, coating, adhesive, binder or combination thereof or article of any of the preceding embodiments wherein the coating, adhesive, binder or combination thereof is applied over a metal substrate, preferably an automotive part, more preferably a body part, optionally after a pre-coat with other coating, adhesive, binder or combination thereof layers, such as an electrocoat, primer and a basecoat.

76. The composition, process, coating, adhesive, binder or combination thereof or article of any of the preceding embodiments wherein the coating, adhesive, binder or combination thereof composition is an architectural, automotive, industrial coating, adhesive, binder or combination thereof or combination thereof.

77. The composition, process, coating, adhesive, binder or combination thereof or article of any of the preceding embodiments wherein the coating, adhesive, binder or combination thereof composition is applied to at least one substrate, preferably at least one metal, plastic, composite, wood, concrete substrate or combination thereof.

78. The composition, process, coating, adhesive, binder or combination thereof or article of any of the preceding embodiments wherein the coating, adhesive, binder or combination thereof composition qualifies as a low VOC coating, adhesive, binder or combination thereof, that, is a coating, adhesive, binder or combination thereof having at most about either 250 or 150 g solvent per liter of coating, adhesive, binder or combination thereof composition or, independently at least about 50 weight percent solids.

79. The composition, process, coating, adhesive, binder or combination thereof or article of any of the preceding embodiments wherein the composition is used as at least one coating, adhesive, binder or combination thereof, ink, adhesive, sealant, or combination thereof.

80. The composition, process, coating, adhesive, binder or combination thereof or article of any of the preceding embodiments wherein the coating, adhesive, binder or combination thereof composition is used as a coating, adhesive, binder or combination thereof for at least one of an automobile body or part, outdoor sign, electronic device, composite or combination thereof, preferably wherein the coating, adhesive, binder or combination thereof is either functional and decorative or a combination there of.

81. The composition, process, coating, adhesive, binder or combination thereof or article of any of the preceding embodiments wherein the coating, adhesive, binder or combination thereof is coated onto at least one substrate comprising at least one metal, plastic, wood or wood product, or combination thereof.

82. The composition, process, coating, adhesive, binder or combination thereof or article of any of the preceding embodiments wherein the resulting coating, adhesive, binder or combination thereof has at least one, advantageously at least about 2, and independently with increasing preference at least about each of 3, 4, 5, 6, or 7 of the following:
   (a) a chemical resistance measured according to the procedure of ASTM 1308 of at least about 4, preferably 5;
   (b) an acid-etch resistance of at least about any of 3, 4 or 5 at 60° C. or independently at least about 2, 3 or 4 to 5 at 70° C.;
   (c) a solvent resistance measured by the procedure of ASTM D5402 using methyl ethyl ketone of at least about any of 150, 175 or 200 to 200 double rubs;
   (d) a Pendulum Hardness measured according to the procedure of ASTM D4366 of at least about any of 40, 50 or 60;
   (e) a Pencil Hardness measured according to the procedure of ASTM D3363 of at least about any of 2 B, HB, or F;
   (f) a Universal Hardness or Vickers Hardness measured using a Vickers indentor commercially available from Fisher Technology, Connecticut under the trade designation FISCHERSCOPE H100C expressed as an HU of at least about any of 10, 20 or 30; or
   (g) an adhesion measured according to the procedure of ASTM D3359 (cross-hatch adhesion) of at least either 4B or 5.

The invention claimed is:

1. A polymer composition comprising:
   a. a chemical binder component consisting essentially of (1) 5 to 90 weight percent of at least one natural oil derived polyol having at least about 50 percent primary hydroxyl groups and (2) sufficient polycaprolactone based polyol to make 100 percent wherein the natural oil derived polyol has an average of from 1.5 to 3 hydroxyl groups per molecule and an equivalent weight of from 200 to 5000; and
   b. a crosslinking component reactive with hydroxyl groups.

2. The composition of claim 1 wherein at least one natural oil derived polyol is a vegetable oil based polyol.

3. The composition of claim 1 wherein the natural oil derived polyol and polycaprolactone based polyol have calculated Hoy solubility parameters differing from one another by at most about 1.5 units.

4. The composition of claim 1 wherein the polycaprolactone based polyol comprises at least one polycaprolactone based polyol, wherein any polycaprolactone based polyol present in an amount greater than about 5 weight percent of the chemical binder component has a calculated Hoy solubility parameter differing from that of the natural oil derived polyol by at most about 1.5 units.

5. The composition of claim 4 wherein the natural oil polyol from which the difference in Hoy solubility parameter is measured is a natural oil polyol present in an amount greater than or equal to the amount of any other natural oil derived polyol present.

6. The composition of claim 1 wherein the crosslinking component is selected from aminoplast resins, polyisocyanates, phenolics, cycloaliphatic epoxides or a combination thereof.

7. The composition of claim 1 wherein the crosslinking component comprises at least one aminoplast resin.

8. The composition of claim 1 wherein the crosslinking component comprises at least one isocyanate compound and the composition has a mole ratio of isocyanate groups on the polyisocyanate in the crosslinking component to the hydroxyl groups of the total binder composition of at least about 0.90 to at most about 1.10.

9. The composition of claim 1 wherein the composition is at least about 60 percent by weight solids in a solvent or volatile organic compound.

10. A coating comprising the composition of claim 1 wherein the coating has at least 2 of the following:
   (a) a chemical resistance measured according to the procedure of ASTM 1308 of at least about 4;
   (b) an acid-etch resistance of at least about any of 3 at 60° C. or independently at least about 2 at 70° C.;
   (c) a solvent resistance measured by the procedure of ASTM D5402 using methyl ethyl ketone of at least about 150 double rubs;
   (d) a Pendulum Hardness measured according to the procedure of ASTM D4366 of at least about 40;
   (e) a Pencil Hardness measured according to the procedure of ASTM D3363 of at least about 2B;
   (f) a Universal Hardness or Vickers Hardness measured using a Vickers indentor commercially available from Fisher Technology, Connecticut under the trade designation FISCHERSCOPE H100C expressed as an HU of at least about 10; or
   (g) an adhesion measured according to the procedure of ASTM D3359 (cross-hatch adhesion) of at least 4B.

11. A coating, adhesive or combination thereof comprising the composition of claim 1.

12. A coating, adhesive, compositional binder or combination thereof comprising the composition of claim 1.

13. An automobile body or part, outdoor sign, electronic device, composition or combination thereof comprising the coating, adhesive, compositional binder or combination thereof of claim 12.

14. An article comprising the coating, adhesive, compositional binder or combination thereof of claim 12.

15. The article of claim 14 which is a laminate.

16. A process for producing a coating, adhesive or compositional binder, the process comprising, in any order:
   (a) admixing a chemical binder component consisting essentially of (1) 5 to 90 weight percent of at least one natural oil derived polyol having at least about 50 percent primary hydroxyl groups and (2) sufficient polycaprolactone based polyol to make 100 percent wherein the natural oil derived polyol has an average of from 1.5 to 30 hydroxyl groups per molecule and an equivalent weight of from 200 to 5000; and a crosslinking component reactive with hydroxyl groups; and
   (b) applying a layer of said admixture on at least one surface of at least one substrate.

17. The process of claim 16 wherein the surface containing the admixture is heated to a temperature of at least about 80° C. to 200° C.

18. A coated substrate produced in accordance with the process of claim 16.

* * * * *